United States Patent
Omry et al.

(10) Patent No.: US 6,756,903 B2
(45) Date of Patent: Jun. 29, 2004

(54) DRIVER ALERTNESS MONITORING SYSTEM

(75) Inventors: Dan Omry, Herzliya (IL); Zvi Ben-Ami Slovin, Moshav Ge'alia (IL)

(73) Assignee: Sphericon Ltd., Bnei Brak (IL)

( * ) Notice: Subject to any disclaimer, the term of this patent is extended or adjusted under 35 U.S.C. 154(b) by 65 days.

(21) Appl. No.: 10/032,815

(22) Filed: Dec. 26, 2001

(65) Prior Publication Data

US 2002/0171553 A1 Nov. 21, 2002

Related U.S. Application Data

(63) Continuation-in-part of application No. 09/849,300, filed on May 4, 2001.

(51) Int. Cl.$^7$ ............................................. G08B 23/00
(52) U.S. Cl. ....................... 340/576; 340/575; 340/522; 340/969; 340/978; 340/425.5; 340/426.15; 701/41; 701/42; 701/45; 701/23; 701/36; 701/37; 701/38
(58) Field of Search ................................ 340/576, 575, 340/522, 969, 978, 425.5, 426.15; 701/41, 42, 45, 23, 36, 37, 38

(56) References Cited

U.S. PATENT DOCUMENTS

| | | | |
|---|---|---|---|
| 3,227,998 A | 1/1966 | Platt | 340/54 |
| 3,631,446 A | 12/1971 | Setser | 340/279 |
| 3,654,599 A | 4/1972 | Sepper | 340/52 |
| 3,953,830 A | 4/1976 | Williams | 340/52 |
| 3,980,999 A | 9/1976 | Nishioka et al. | 340/279 |
| 4,007,357 A | 2/1977 | Yanagishima | 235/92 |
| 4,017,843 A | 4/1977 | Yanagishima | 340/279 |
| 4,104,621 A | 8/1978 | Yanagishima et al. | 340/576 |
| 4,450,438 A | 5/1984 | Seko et al. | 340/576 |
| 4,463,347 A | 7/1984 | Seko et al. | 340/576 |
| 4,496,938 A | 1/1985 | Seko et al. | 340/576 |
| 4,509,040 A | 4/1985 | Seko et al. | 340/576 |
| 4,518,954 A | 5/1985 | Seko et al. | 340/576 |
| 4,564,833 A | 1/1986 | Seko et al. | 340/576 |
| 4,565,997 A | 1/1986 | Seko et al. | 340/576 |
| 4,581,607 A | 4/1986 | Seko et al. | 340/576 |
| 4,586,032 A | 4/1986 | Seko et al. | 340/576 |
| 4,594,583 A | 6/1986 | Seko et al. | 340/576 |
| 4,604,611 A | 8/1986 | Seko et al. | 340/576 |
| 4,611,199 A | 9/1986 | Seko et al. | 340/576 |
| 4,673,913 A | 6/1987 | Akita et al. | 340/52 |
| 4,794,536 A | 12/1988 | Eto et al. | 364/424.05 |
| 4,853,672 A | 8/1989 | Yasuda et al. | 340/465 |
| 4,984,646 A | 1/1991 | Sano et al. | 180/79.1 |
| 4,996,657 A | 2/1991 | Shiraishi et al. | 364/559 |
| 5,057,834 A | 10/1991 | Nordstrom | 340/963 |
| 5,097,917 A | 3/1992 | Serizawa et al. | 180/79.1 |
| 5,282,135 A | 1/1994 | Sato et al. | 364/424.05 |
| 5,465,079 A | 11/1995 | Bouchard et al. | 340/576 |
| 5,488,353 A | 1/1996 | Kawakami et al. | 340/576 |
| 5,548,273 A | 8/1996 | Nicol et al. | 340/439 |
| 5,568,127 A | 10/1996 | Bang | 340/575 |
| 5,570,087 A | 10/1996 | Lemelson | 340/870.05 |
| 5,570,698 A | 11/1996 | Liang et al. | 128/745 |
| 5,574,641 A | * 11/1996 | Kawakami et al. | 701/1 |

(List continued on next page.)

Primary Examiner—Benjamin C. Lee
Assistant Examiner—Tai T. Nguyen
(74) Attorney, Agent, or Firm—Ladas & Parry

(57) ABSTRACT

A system and methodology for determining the alertness of a driver of a motor vehicle including sensing at least one first movement characteristic of at least a first part of a motor vehicle, sensing at least one second movement characteristic of at least a second part of the motor vehicle, employing at least one time relationship between the at least one first movement characteristic and the at least one second movement characteristic in order to sense and to distinguish between driver initiated movements and non-driver initiated movements and determining the alertness of the driver of the motor vehicle based on at least one relationship between the driver initiated movements and the non-driver initiated movements.

91 Claims, 14 Drawing Sheets

U.S. PATENT DOCUMENTS

| | | | |
|---|---|---|---|
| 5,585,785 A | 12/1996 | Gwin et al. | 340/575 |
| 5,673,237 A | 9/1997 | Blank | 368/10 |
| 5,675,313 A | 10/1997 | Keluskar | 340/425.5 |
| 5,682,144 A | 10/1997 | Mannik | 340/575 |
| 5,684,455 A | 11/1997 | Williams et al. | 340/439 |
| 5,684,462 A | 11/1997 | Gold | 340/576 |
| 5,689,241 A | 11/1997 | Clarke, Sr. et al. | 340/575 |
| 5,709,281 A | 1/1998 | Sherwin et al. | 180/272 |
| 5,714,925 A | 2/1998 | Lee et al. | 340/309.15 |
| 5,717,606 A | 2/1998 | Hara et al. | 364/551.01 |
| 5,729,619 A | 3/1998 | Puma | 382/115 |
| 5,745,031 A | 4/1998 | Yamamoto | 340/439 |
| 5,765,116 A | 6/1998 | Wilson-Jones et al. | 701/41 |
| 5,774,088 A | 6/1998 | Kreithen | 342/22 |
| 5,786,765 A | 7/1998 | Kumakura et al. | 340/576 |
| 5,795,306 A | 8/1998 | Shimotani et al. | 600/558 |
| 5,798,695 A | 8/1998 | Metalis et al. | 340/576 |
| 5,805,079 A | 9/1998 | Lemelson | 340/870.05 |
| 5,805,720 A | 9/1998 | Suenaga et al. | 382/117 |
| 5,813,993 A | 9/1998 | Kaplan et al. | 600/544 |
| 5,815,070 A | 9/1998 | Yoshikawa | 340/439 |
| 5,821,860 A | 10/1998 | Yokoyama et al. | 340/576 |
| 5,835,008 A | 11/1998 | Colemere, Jr. | 340/439 |
| 5,835,028 A | 11/1998 | Bender et al. | 340/937 |
| 5,847,648 A | 12/1998 | Savor et al. | 340/309.15 |
| 5,850,193 A | 12/1998 | Shimoura et al. | 340/995 |
| 5,867,587 A | 2/1999 | Aboutalib et al. | 382/117 |
| 5,900,819 A | 5/1999 | Kyrtsos | 340/576 |
| 5,917,415 A | 6/1999 | Atlas | 340/576 |
| 5,923,263 A | 7/1999 | Rodriguez | 340/689.1 |
| 5,925,082 A | 7/1999 | Shimizu et al. | 701/41 |
| 5,939,989 A | 8/1999 | Bang | 340/575 |
| 5,942,979 A | 8/1999 | Luppino | 340/576 |
| 5,969,616 A | 10/1999 | Tschoi | 340/576 |
| 5,982,287 A | 11/1999 | Brannen et al. | 340/575 |
| 6,023,227 A | 2/2000 | Yanko et al. | 340/576 |
| 6,046,671 A * | 4/2000 | Shimoura et al. | 340/439 |
| 6,061,610 A | 5/2000 | Boer | 701/1 |
| 6,064,301 A | 5/2000 | Takahashi et al. | 340/435 |
| 6,067,020 A | 5/2000 | Wimmer | 340/575 |
| 6,087,941 A | 7/2000 | Ferraz | 340/575 |
| 6,087,943 A | 7/2000 | Bailey | 340/576 |
| 6,091,334 A | 7/2000 | Galiana et al. | 340/576 |
| 6,097,286 A | 8/2000 | Discenzo | 340/465 |
| 6,097,295 A | 8/2000 | Griesinger et al. | 340/576 |
| 6,104,296 A | 8/2000 | Yasushi et al. | 340/576 |
| 6,120,461 A | 9/2000 | Smyth | 600/558 |
| 6,130,617 A | 10/2000 | Yeo | 340/575 |
| 6,154,123 A | 11/2000 | Kleinberg | 340/436 |
| 6,167,298 A | 12/2000 | Levin | 600/545 |
| 6,172,610 B1 | 1/2001 | Prus | 340/575 |
| 6,313,749 B1 * | 11/2001 | Horne et al. | 340/575 |

* cited by examiner

FIG. 5A
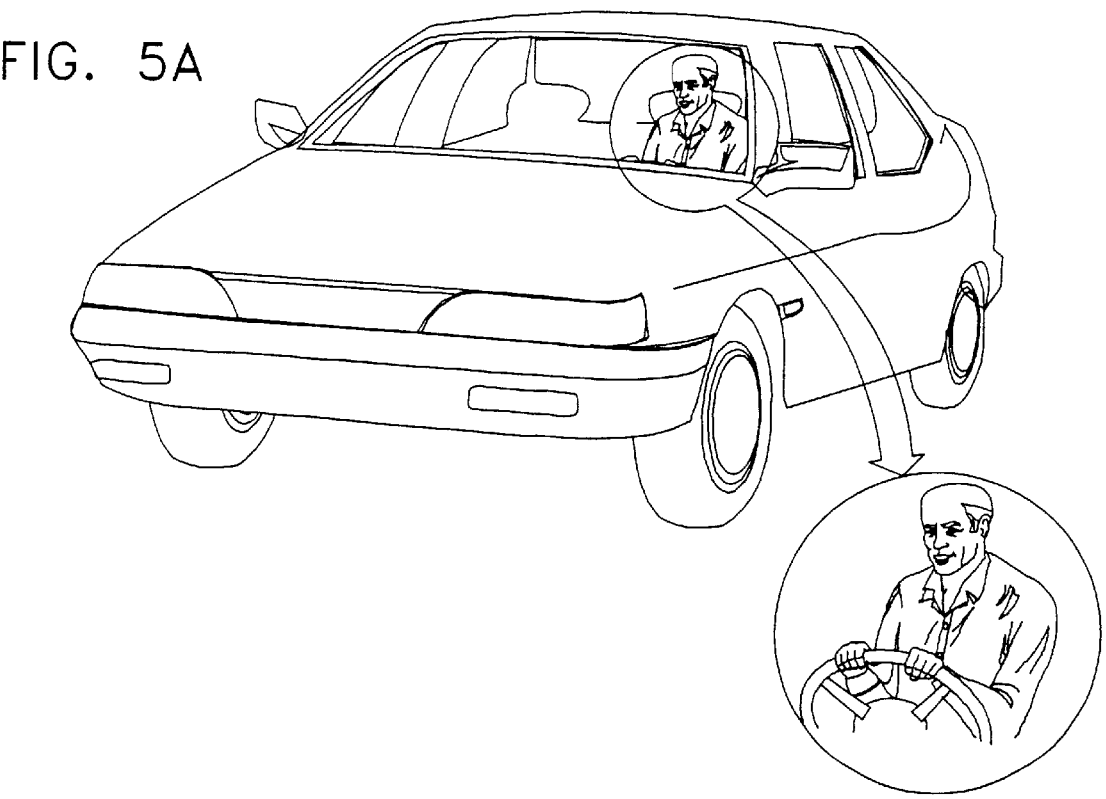
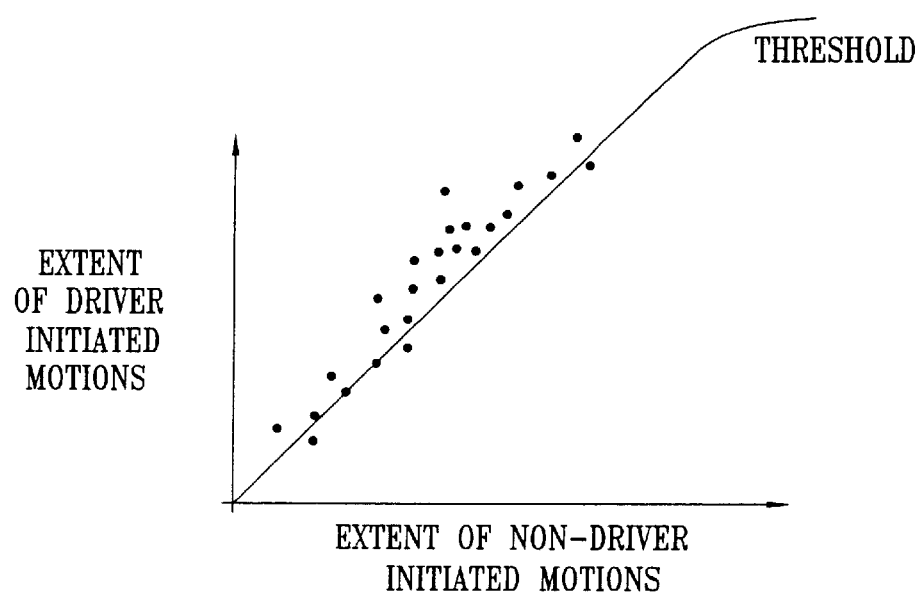

FIG. 5B
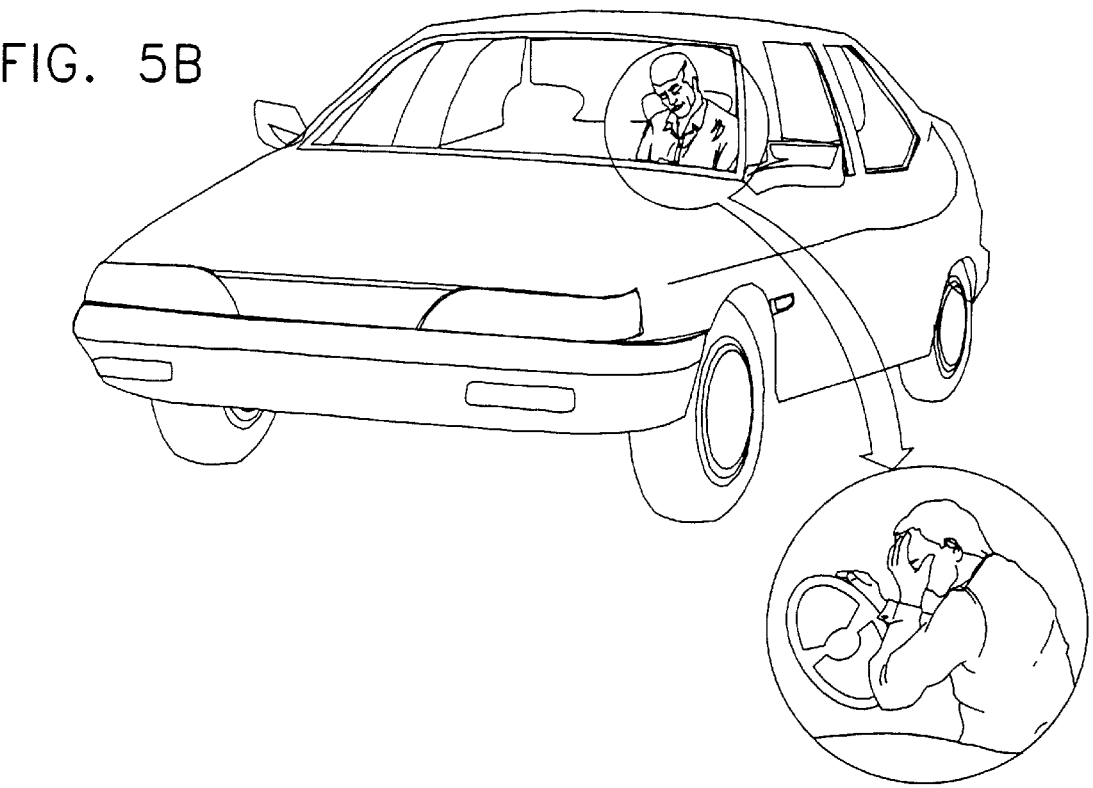
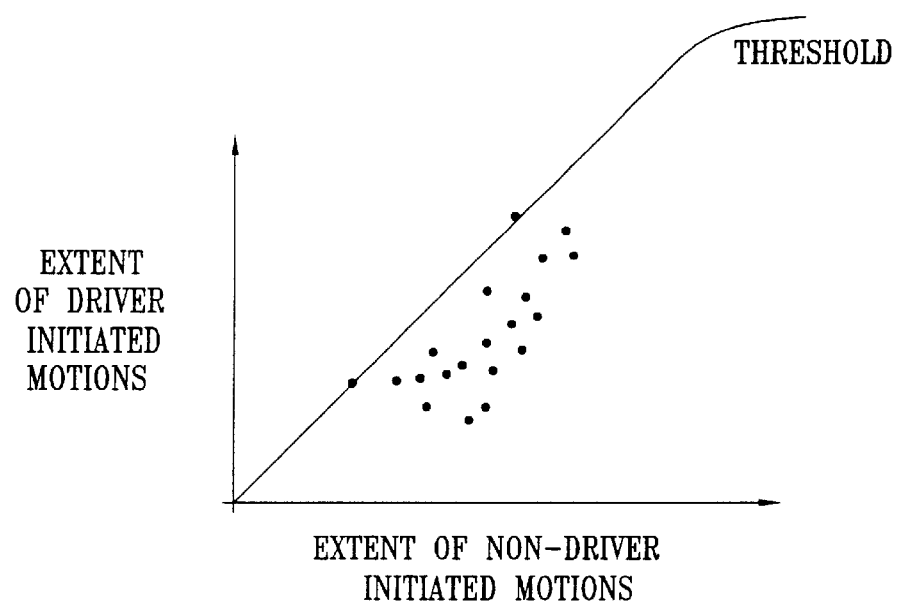
EXTENT
OF DRIVER
INITIATED
MOTIONS
THRESHOLD
EXTENT OF NON-DRIVER
INITIATED MOTIONS

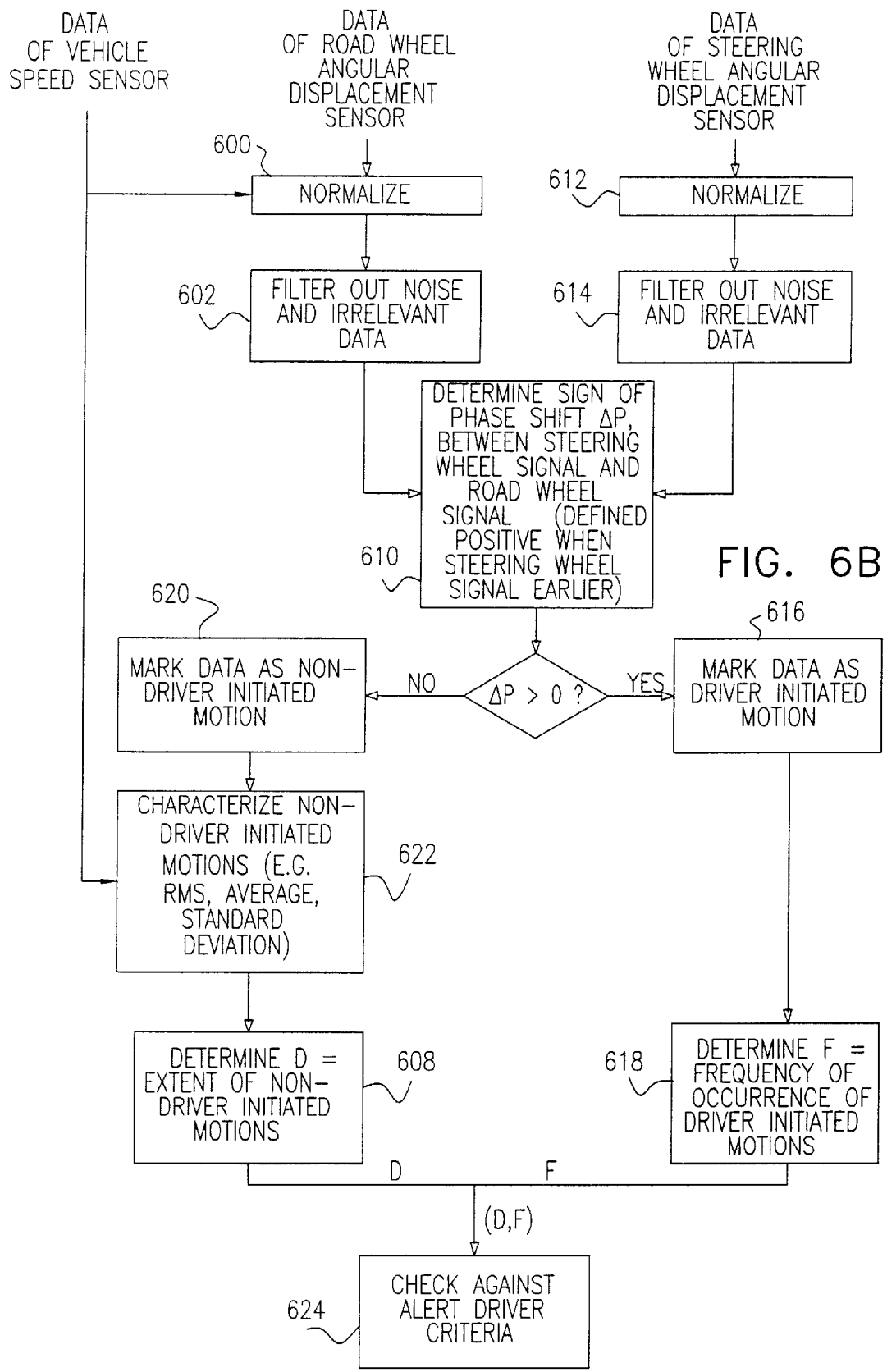

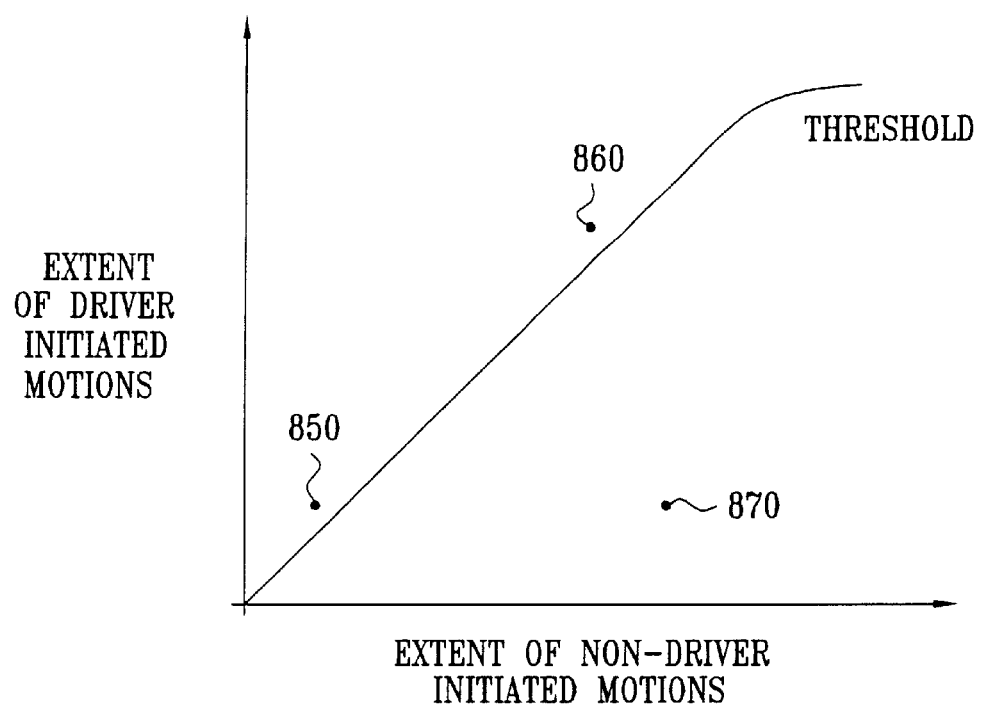

DRIVER ALERTNESS MONITORING SYSTEM

REFERENCE TO CO-PENDING APPLICATION

This Applicantion is A CIP of U.S. patent application Ser. No. 09/849,300, filed May 4, 2001, entitled "Driver Alertness Measuring Apparatus".

FIELD OF THE INVENTION

The present invention relates to alertness monitoring for drivers of motor vehicles.

BACKGROUND OF THE INVENTION

The following patents are believed to represent the current state of the art:

U.S. Pat. Nos. 3,227,998; 3,631,446; 3,654,599; 3,953,830; 3,980,999; 4,007,357; 4,017,843; 4,104,621; 4,450,438; 4,463,347; 4,496,938; 4,509,040; 4,518,954; 4,564,833; 4,565,997; 4,581,607; 4,586,032; 4,594,583; 4,604,611; 4,611,199; 4,673,913; 4,794,536; 4,853,672; 4,984,646; 4,996,657; 5,057,834; 5,097,917; 5,282,135; 5,465,079; 5,488,353; 5,548,273; 5,568,127; 5,570,087; 5,570,698; 5,585,785; 5,675,313; 5,684,455; 5,684,462; 5,689,241; 5,709,281; 5,714,925; 5,717,606; 5,729,619; 5,745,031; 5,765,116; 5,786,765; 5,795,306; 5,798,695; 5,805,079; 5,805,720; 5,813,993; 5,815,070; 5,821,860; 5,835,008; 5,835,028; 5,847,648; 5,850,193; 5,867,587; 5,900,819; 5,917,415; 5,923,263; 5,925,082; 5,939,989; 5,942,979; 5,969,616; 5,982,287; 6,023,227; 6,061,610; 6,064,301; 6,067,020; 6,087,941; 6,087,943; 6,091,334; 6,097,286; 6,097,295; 6,172,610.

SUMMARY OF THE INVENTION

The present invention seeks to provide an improved methodology and system for monitoring the alertness of drivers of motor vehicles.

There is thus provided in accordance with a preferred embodiment of the present invention a methodology for determining the alertness of a driver of a motor vehicle including:

sensing at least one first movement characteristic of at least a first part of a motor vehicle;

sensing at least one second movement characteristic of at least a second part of the motor vehicle;

employing at least one time relationship between the at least one first movement characteristic and the at least one second movement characteristic in order to sense and to distinguish between driver initiated movements and non-driver initiated movements; and determining the alertness of the driver of the motor vehicle based on at least one relationship between the driver initiated movements and the non-driver initiated movements.

There is also provided in accordance with a preferred embodiment of the present invention, a methodology for determining the alertness of a driver of a motor vehicle including.

employing at least one time relationship between at least one first movement characteristic of at least a first part of a motor vehicle and at least one second movement characteristic of at least a second part of the motor vehicle in order to sense and to distinguish between driver initiated movements and non-driver initiated movements; and determining the alertness of the driver of the motor vehicle based on at least one relationship between the driver initiated movements and the non-driver initiated movements.

There is additionally provided in accordance with a preferred embodiment of the present invention a methodology for determining the alertness of a driver of a motor vehicle including:

sensing at least one first movement characteristic of at least a first part of a motor vehicle;

sensing at least one second movement characteristic of at least a second part of a motor vehicle; and employing the at least one first movement characteristic and the at least one second movement characteristic in order to determine the alertness of the driver of the motor vehicle There is further provided in accordance with a preferred embodiment of the present invention a methodology for determining the alertness of a driver of a motor vehicle including:

sensing at least one first movement characteristic of at least a first part of a motor vehicle;

sensing at least one second movement characteristic of at least a second part of the motor vehicle;

employing the at least one first movement characteristic and the at least one second movement characteristic in order to sense driver initiated movements; and determining the alertness of the driver of the motor vehicle based at least partially on the sensed driver initiated movements.

There is additionally provided in accordance with a preferred embodiment of the present invention a system for determining the alertness of a driver of a motor vehicle including:

a first sensor sensing at least one first movement characteristic of at least a first part of a motor vehicle;

a second sensor sensing at least one second movement characteristic of at least a second part of the motor vehicle;

a distinguisher, employing at least one time relationship between the at least one first movement characteristic and the at least one second movement characteristic in order to sense and to distinguish between driver initiated movements and non-driver initiated movements; and an alertness determiner, determining the alertness of the driver of the motor vehicle based on at least one relationship between the driver initiated movements and the non-driver initiated movements.

There is further provided in accordance with a preferred embodiment of the present invention a system for determining the alertness of a driver of a motor vehicle including:

a distinguisher, employing at least one time relationship between at least one first movement characteristic of at least a first part of a motor vehicle and at least one second movement characteristic of at least a second part of the motor vehicle in order to sense and to distinguish between driver initiated movements and non-driver initiated movements; and an alertness determiner, determining the alertness of the driver of the motor vehicle based on at least one relationship between the driver initiated movements and the non-driver initiated movements.

There is still further provided in accordance with a preferred embodiment of the present invention a system for determining the alertness of a driver of a motor vehicle including:

a first sensor, sensing at least one first movement characteristic of at least a first part of a motor vehicle;

a second sensor, sensing at least one second movement characteristic of at least a second part of a motor vehicle; and a distinguisher, employing the at least one first movement characteristic and the at least one second movement characteristic in order to determine the alertness of the driver of the motor vehicle.

There is yet further in accordance with a preferred embodiment of the present invention provided a system for determining the alertness of a driver of a motor vehicle including:

a first sensor, sensing at least one first movement characteristic of at least a first part of a motor vehicle;

a second sensor, sensing at least one second movement characteristic of at least a second part of the motor vehicle;

a distinguisher, employing the at least one first movement characteristic and the at least one second movement characteristic in order to sense driver initiated movements; and an alertness determiner, determining the alertness of the driver of the motor vehicle based at least partially on the sensed driver initiated movements.

There is still further provided in accordance with a preferred embodiment of the present invention a methodology for determining the alertness of a driver of a motor vehicle including:

sensing at least one characteristic of driver initiated movements of at least one part of a motor vehicle;

sensing at least one characteristic of non-driver initiated movements of at least one part of a motor vehicle; and determining the alertness of the driver of the motor vehicle based on at least one relationship between the driver initiated movements and the non-driver initiated movements.

There is additionally provided in accordance with a preferred embodiment of the present invention a system for determining the alertness of a driver of a motor vehicle including:

a driver initiated movement sensor, sensing at least one characteristic of driver initiated movements of at least one part of a motor vehicle;

a non-driver initiated movement sensor, sensing at least one characteristic of non-driver initiated movements of at least one part of a motor vehicle; and a determiner, determining the alertness of the driver of the motor vehicle based on at least one relationship between the driver initiated movements and the non-driver initiated movements.

Preferably, the at least one characteristic of driver initiated movements is extent.

Preferably, the at least one characteristic of non-driver initiated movements is extent.

In accordance with a preferred embodiment of the present invention, extent of driver initiated movements includes at least one of:

the integrated magnitude of the driver initiated movements;

the RMS average of the magnitude of the driver initiated movements;

the number of peaks of the driver initiated movements per unit time.

In accordance with a preferred embodiment of the present invention, extent of non-driver initiated movements includes at least one of:

the integrated magnitude of the non-driver initiated movements;

the RMS average of the magnitude of the non-driver initiated movements;

the number of peaks of the non-driver initiated movements per unit time.

The driver initiated movements and the non-driver initiated movements as well as the extent thereof may represent or be represented by, for example, force, torque, strain, acceleration, angular displacement, angular velocity, linear velocity and linear displacement.

Preferably, the sensing at least one characteristic of driver initiated movements of at least one part of a motor vehicle and the sensing at least one characteristic of non-driver initiated movements of at least one part of a motor vehicle include sensing at least one first movement characteristic and sensing at least one second movement characteristic of the motor vehicle.

Preferably, the at least one first movement characteristic includes a steering wheel movement characteristic and the at least one second movement characteristic includes a road wheel movement characteristic.

In accordance with a preferred embodiment of the present invention, the at least one first movement characteristic and the at least one second movement characteristic include movement characteristics of first and second locations along a steering assembly extending from a steering wheel to at least one road wheel of the motor vehicle.

Preferably, the at least one first movement characteristic includes a steering assembly movement characteristic and the at least one second movement characteristic includes a vehicle body movement characteristic.

In accordance with a preferred embodiment of the present invention, the at least one first movement characteristic includes a steering assembly movement characteristic and the at least one second movement characteristic includes a vehicle chassis movement characteristic.

Preferably, the first and second locations are located respectively at or upstream of and at or downstream of a power steering unit forming part of the steering assembly.

In accordance with a preferred embodiment of the present invention, the first location is at a steering wheel forming part of the steering assembly.

Preferably, the at least one first movement characteristic is angular displacement of the steering wheel; and the at least one second movement characteristic is a steering angle of at least one road wheel.

In accordance with a preferred embodiment of the present invention, the at least one first movement characteristic is displacement; and the at least one second movement characteristic is displacement.

Alternatively, the at least one first movement characteristic is displacement; and the at least one second movement characteristic is acceleration in at least one direction.

Preferably, determining also employs the speed of the vehicle.

In accordance with a preferred embodiment of the present invention, the driver initiated movement sensor sensing at least one characteristic of driver initiated movements of at least one part of a motor vehicle and the non-driver initiated movement sensor sensing at least one characteristic of non-driver initiated movements of at least one part of a motor vehicle include a first sensor, sensing at least one first movement characteristic and a second sensor sensing at least one second movement characteristic of the motor vehicle.

Preferably, the system also includes a driver alertness alarm, responsive to an alarm from the driver alertness determiner, for providing an alarm to a driver deemed not to be sufficiently alert.

BRIEF DESCRIPTION OF THE DRAWINGS

The present invention will be understood and appreciated more fully from the following detailed description, taken in conjunction with the drawings in which:

FIGS. 5A and 5B are simplified pictorial illustrations of a methodology for determining the alertness of a driver of a motor vehicle in accordance with another preferred embodiment of the present invention, respectively illustrating operation when a driver is alert and when a driver is not alert;

FIG. 6B is a simplified flow chart of the functionality of FIGS. 5A and 5B in accordance with another preferred embodiment of the present invention;

FIG. 8 is a diagram in the form appearing also in FIGS. 5A and 5B, illustrating data points produced in accordance with the present invention from the data appearing in FIGS. 7A, 7B and 7C.

DETAILED DESCRIPTION OF PREFERRED EMBODIMENTS

Figure 1A:
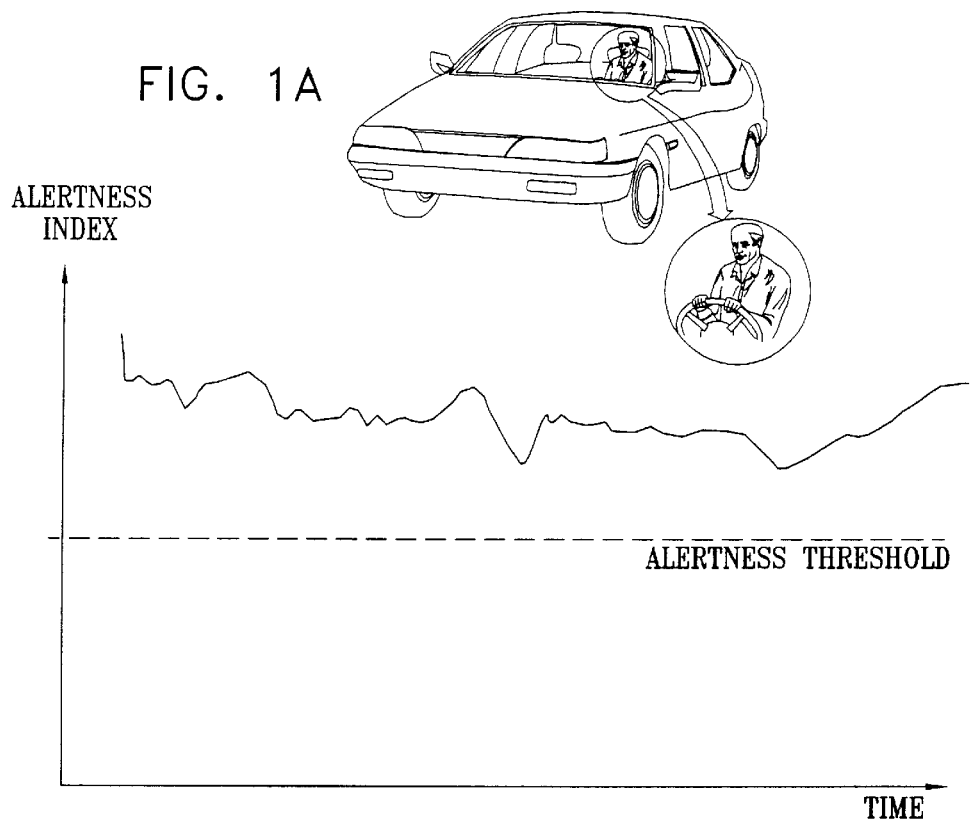
FIGS. 1A and 1B are simplified pictorial illustrations of a methodology for determining the alertness of a driver of a motor vehicle in accordance with a preferred embodiment of the present invention, respectively illustrating operation when a driver is alert and when a driver is not alert.
Figure 1B:
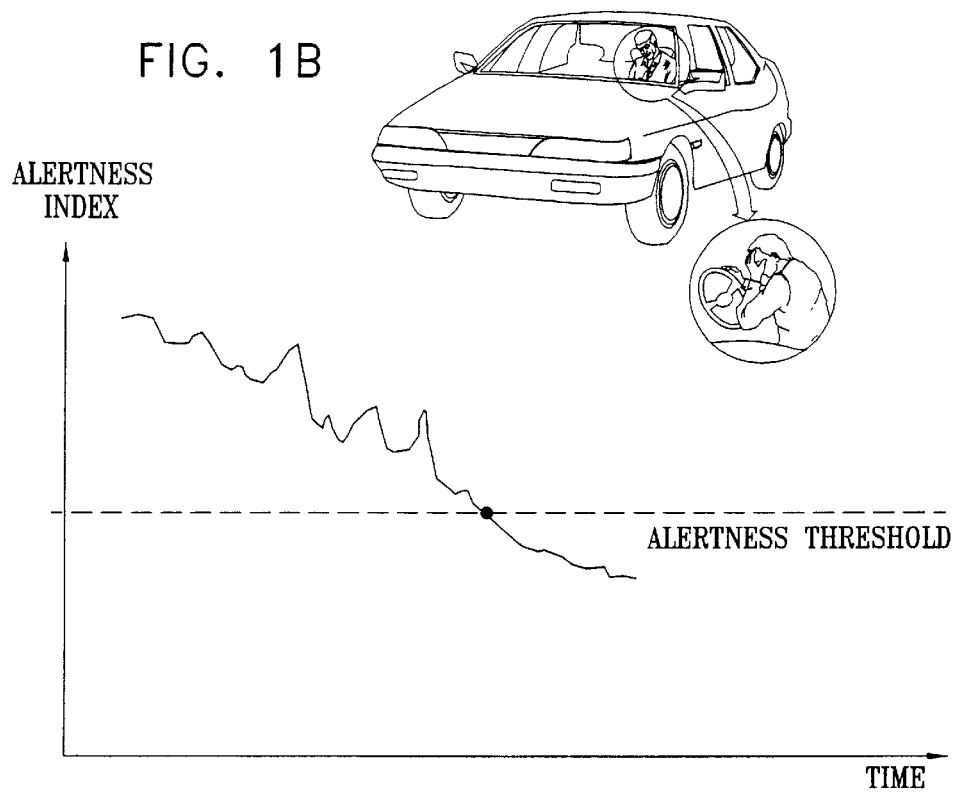

Reference is now made to FIGS. 1A and 1B, which are simplified pictorial illustrations of a system and methodology for determining the alertness of a driver of a motor vehicle in accordance with a preferred embodiment of the present invention, respectively illustrating operation when a driver is alert and when a driver is not alert.

As seen in FIGS. 1A and 1B, an alertness index, which measures the alertness of the driver, is calculated on a continuous basis at regular intervals based on a statistical relationship between at least one characteristic of driver initiated movements of at least one part of a motor vehicle and at least one characteristic of non-driver initiated movements of at least one part of a motor vehicle.

A typical driver initiated movement includes controlled movements of the motor vehicle, as for example by the driver turning the steering wheel. A typical non-driver initiated movement of the motor vehicle includes uncontrolled movements of the motor vehicle, resulting for example from the car encountering an uneven section of the road or a gust of wind or the vehicle having unbalanced wheels.

In a preferred embodiment of the invention illustrated in FIGS. 1A and 1B, the at least one characteristic of both driver initiated movements and of non-driver initiated movements is extent. The use of the term "extent", when used with "driver initiated movements" and "non-driver initiated movements", is intended to convey measures of such movements. This measure may be derived in one or more different ways.

It is appreciated that alternatively different characteristics or metrics may be employed for driver initiated movements and for non-driver initiated movements.

As will be described hereinbelow, for the purposes of the present invention, extent may be one or more of at least the following parameters for driver initiated movements:

the integrated magnitude of the driver initiated movements;

the RMS average of the magnitude of the driver initiated movements;

the number of peaks of the driver initiated movements per unit time.

Likewise, extent may be one or more of at least the following parameters for non-driver initiated movements:

the integrated magnitude of the non-driver initiated movements;

the RMS average of the magnitude of the non-driver initiated movements;

the number of peaks of the non-driver initiated movements per unit time.

Alternatively or additionally, extent may involve one or more additional parameters.

The driver initiated movements and the non-driver initiated movements as well as the extent thereof may represent or be represented by, for example, force, torque, strain, acceleration, angular displacement, angular velocity, linear velocity and linear displacement.

The term "magnitude" as used in the present application may refer to the amount of movement, irrespective of whether that movement is linear movement, angular movement or a combination thereof. Additionally, the term "magnitude" as used in the present application may also refer to a mathematical combination of the movement and another parameter, such as the vehicle speed.

The alertness index is defined as a relationship between the extent of driver initiated movement and the extent of non-driver initiated movement. This alertness index, which is shown graphically in FIGS. 1A and 1B, is compared with an alertness threshold The relationship between the alertness index and the alertness threshold over time is used to determine whether an alarm is to be provided.

The "ALERTNESS THRESHOLD" lines shown in FIGS. 1A and 1B represent values of the alertness index below which driver alertness is determined to be insufficient and thus represent a predetermined relationship between driver initiated movements and non-driver initiated movements.

In practice, an additional threshold, not represented in FIGS. 1A and 1B, here termed an alarm threshold, is preferably applied to the relationship between the alertness index and the alertness threshold over time. The alarm threshold may take into account, for example, the frequency and duration of failure to maintain the alertness index above the alertness threshold over time.

In setting the alarm threshold, care is taken not to provide false alarms unnecessarily, which would result in driver dissatisfaction and refusal to use the system. In practice, an alarm threshold is predetermined or selectable and does not fail to provide an alarm when the driver is not sufficiently alert.

Turning to FIG. 1A, it is appreciated that operation of a motor vehicle by an alert driver is preferably characterized in that for at least a predetermined majority of a multiplicity of different time periods, the alertness index exceeds the alertness threshold.

FIG. 1B shows that corresponding operation of a motor vehicle by a non-alert driver is preferably characterized in that for at least a predetermined portion of a multiplicity of different time periods, the alertness index does not exceed the alertness threshold.

Figure 2:
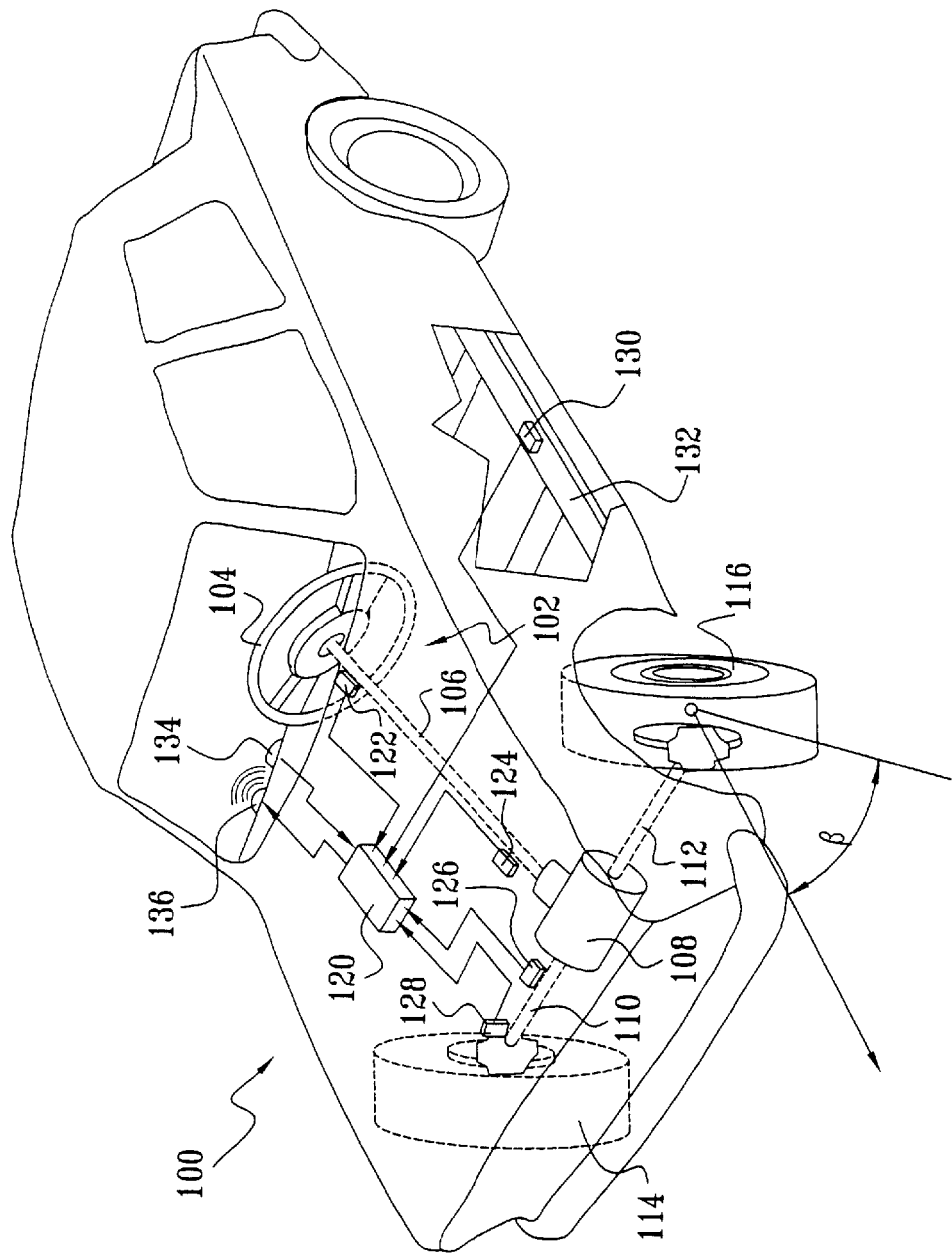
FIG. 2 is a simplified pictorial illustration of a system operative to provide the functionality of FIGS. 1A and 1B and showing inter alia a steering assembly and part of a chassis of a typical motor vehicle as well as illustrating a plurality of locations where measurements of movement may be made in accordance with a preferred embodiment of the present invention.

Reference is now made to FIG. 2, which is a simplified pictorial illustration of a steering assembly and part of a chassis of a typical motor vehicle, illustrating a plurality of locations therealong where measurements of movement may be made in accordance with a preferred embodiment of the present invention.

In the motor vehicle shown in FIG. 2 and designated generally by reference numeral 100, there is provided a conventional steering assembly 102, including a steering wheel 104, a steering wheel shaft 106, connecting the steering wheel to a power steering unit 108, as well as right and left linkages 110 and 112 which connect the power steering unit to road wheels 114 and 116, respectively.

It is appreciated that the present invention may also be used with motor vehicles which do not include a power steering unit 108.

In accordance with a preferred embodiment of the present invention, a driver alertness determining system is provided including a computation unit 120 which receives inputs from one or more sensors. The sensors are preferably operable to sense dynamic characteristics of the vehicle or parts thereof and may include, for example, force sensors, torque sensors, strain sensors, accelerometers, angular displacement sensors, angular velocity sensors, linear velocity sensors and linear displacement sensors.

In the illustrated embodiment, preferably including a first angular movement sensor 122 disposed adjacent steering wheel shaft 106 at the steering wheel side thereof, a second angular movement sensor 124 disposed adjacent steering wheel shaft 106 at the power steering unit side thereof, a third angular movement sensor 126 disposed adjacent one of linkages 110 and 112, a fourth angular movement sensor 128 disposed adjacent a road wheel 114 or 116 and an acceleration sensor 130 mounted on a chassis portion 132 thereof.

Computation unit 120 also preferably receives an input from a vehicle speed sensor 134 and provides a driver sensible output via a driver alertness alarm 136, which may be any suitable alarm such as a tactile, visual, audio or audiovisual alarm.

As will be described hereinafter in detail, preferably inputs are received from two of the angular movement sensors, one adjacent the road wheels and one adjacent the steering wheel. Alternatively or additionally, an input from the acceleration sensor 130 in combination with one or more inputs from angular movement sensors may be employed.

Figure 3A:
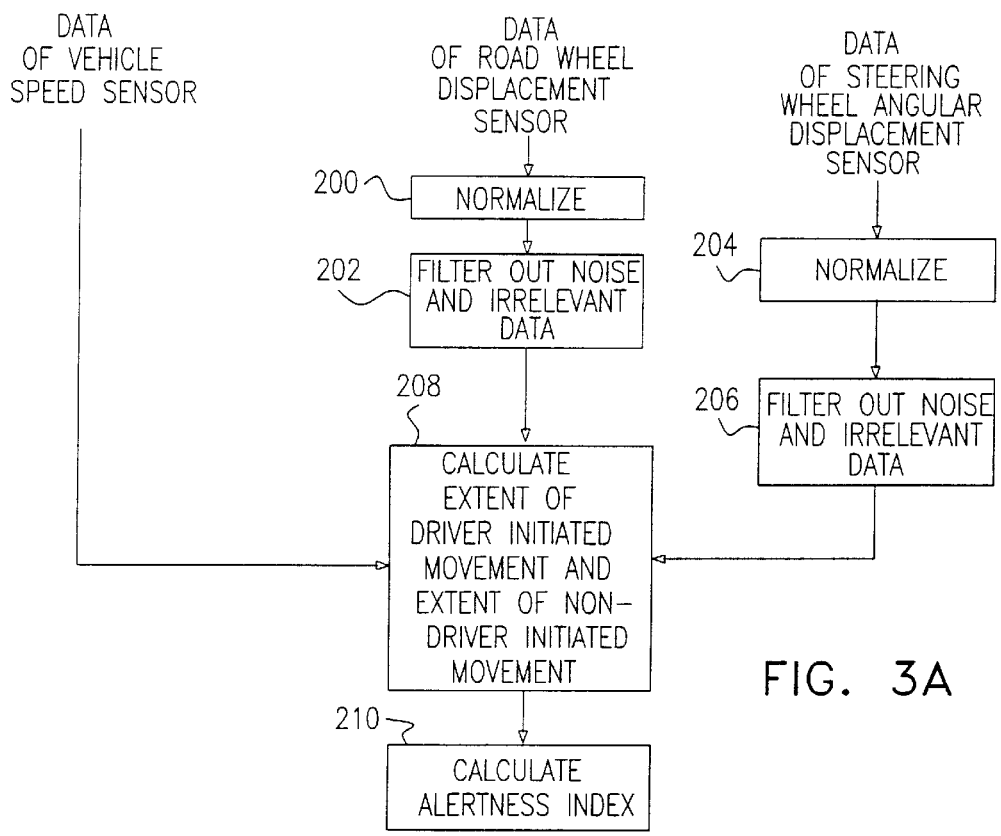
FIG. 3A is a simplified flow chart of the functionality of FIGS. 1A and 1B in accordance with one preferred embodiment of the present invention.

Reference is now made to FIG. 3A, which is a simplified flow chart illustrating the functionality of FIGS. 1A and 1B in accordance with one preferred embodiment of the present invention. As seen in FIG. 3A, data from a road wheel influenced displacement sensor, such as either of sensors 126 and 128 (FIG. 2), is normalized, at block 200, preferably to eliminate variations in measurements resulting from differences in the magnitudes of movement sensed by different sensors.

It is appreciated that the term "displacement" as used throughout may, where suitable, refer to either or both of linear and angular displacements. In the case of steering wheel movement, the sensed displacement is angular displacement. In the case of road wheel displacement, either or both of angular displacement of the road wheel itself and linear displacement of elements coupled thereto may be sensed.

The output of block 200 is then filtered, at block 202, to remove noise. Data from a steering wheel influenced angular displacement sensor, such as either of sensors 122 and 124 (FIG. 2), is normalized, at block 204, preferably to eliminate variations in measurements resulting from differences in the magnitudes of the movement sensed by different sensors. The output of block 204 is then filtered, at block 206, to remove noise.

The extents of driver initiated movement and non-driver initiated movement are calculated at block 208, based on inputs received from blocks 202 and 206 as well as input from a vehicle speed sensor 134 (FIG. 2) of vehicle 100 (FIG. 2).

This calculation preferably employs the following equations:

$$m_1 = k_1\alpha + k_2\beta + k_3\dot{\alpha} + k_4\dot{\beta} + k_5\ddot{\alpha} + k_6\ddot{\beta} + k_7\alpha^2 + k_8\beta^2 + k_9\dot{\alpha}^2 + k_{10}\dot{\beta}^2 \ldots$$

$$m_2 = l_1\alpha + l_2\beta + l_3\dot{\alpha} + l_4\dot{\beta} + l_5\ddot{\alpha} + l_6\ddot{\beta} + l_7\alpha^2 + l_8\beta^2 + l_9\dot{\alpha}^2 + l_{10}\dot{\beta}^2 \ldots$$

where:

$m_1$ is the extent of driver initiated movement;

$m_2$ is the extent of non-driver initiated movement;

$\alpha$ is the angular displacement of the steering wheel, represented by the output of block 206;

$\dot{\alpha}$ is the angular velocity of the steering wheel, represented by the first time derivative of the output of block 206;

$\ddot{\alpha}$ is the angular acceleration of the steering wheel, represented by the second time derivative of the output of block 206;

$\beta$ (FIG. 2) is the angular displacement of the road wheels, represented by the output of block 202;

$\dot{\beta}$ is the angular velocity of the road wheels, represented by the first time derivative of the output of block 202;

$\beta$ is the angular acceleration of the road wheels, represented by the second time derivative of the output of block 202;

$k_1 \ldots k_n$ are coefficients, which are typically derived empirically or analytically, $l_1 \ldots l_n$ are coefficients, which are typically derived empirically or analytically.

In a preferred embodiment of the invention, which represents the best mode currently known to the inventors, the following equations are employed:

$$m_1 = -0.0906\alpha + 0.0163\beta - 0.0576\dot{\alpha} + 0.0032\dot{\beta} + \ddot{\alpha}$$

$$m_2 = 0.0960\alpha + 0.0036\beta - 0.0730\dot{\alpha} - 0.0418\dot{\beta} + \ddot{\beta}$$

where:

$m_1$ is the extent of driver initiated movement;

$m_2$ is the extent of non-driver initiated movement;

$\alpha$ is the angular displacement of the steering wheel, represented by the output of block 206;

$\dot{\alpha}$ is the angular velocity of the steering wheel, represented by the first time derivative of the output of block 206, $\ddot{\alpha}$ is the angular acceleration of the steering wheel, represented by the second time derivative of the output of block 206, $\beta$ (FIG. 2) is the angular displacement of the road wheels, represented by the output of block 202;

$\dot{\beta}$ is the angular velocity of the road wheels, represented by the first time derivative of the output of block 202;

$\ddot{\beta}$ is the angular acceleration of the road wheels, represented by the second time derivative of the output of block 202;

The extents $m_1$ and $m_2$ are employed in block 210 to calculate the alertness index for a multiplicity of discrete time periods.

Initially $m_1$ and $m_2$ are each preferably multiplied by a vehicle speed factor, typically received as an input from the vehicle speed sensor 134 of the vehicle 100 (FIG. 2). The multiplication product is preferably integrated over the duration of each discrete time period. The integrals of the multiplication products for $m_1$ and $m_2$ are combined, preferably according to an equation:

$$AI = \frac{\int |m_2 + m_1| v \, dt}{\int m_2 v \, dt + C}$$

where:

AI is the alertness index;

$m_1$ is the extent of driver initiated movement;

$m_2$ is the extent of non-driver initiated movement;

v is the instantaneous velocity of the vehicle;

t is time;

C is a constant.

The alertness index, as calculated in block 210, is compared over time to an alertness threshold. The relationship between the alertness index and the alertness threshold is preferably continuously monitored, in monitoring cycles repeated typically four times per minute, and the differences between the alertness index and the alertness threshold are noted. These differences are employed in an algorithm which evaluates whether the relationship between the alertness index and the alertness threshold is characteristic of insufficient driver alertness and thus exceeds the alarm threshold.

Figure 4:
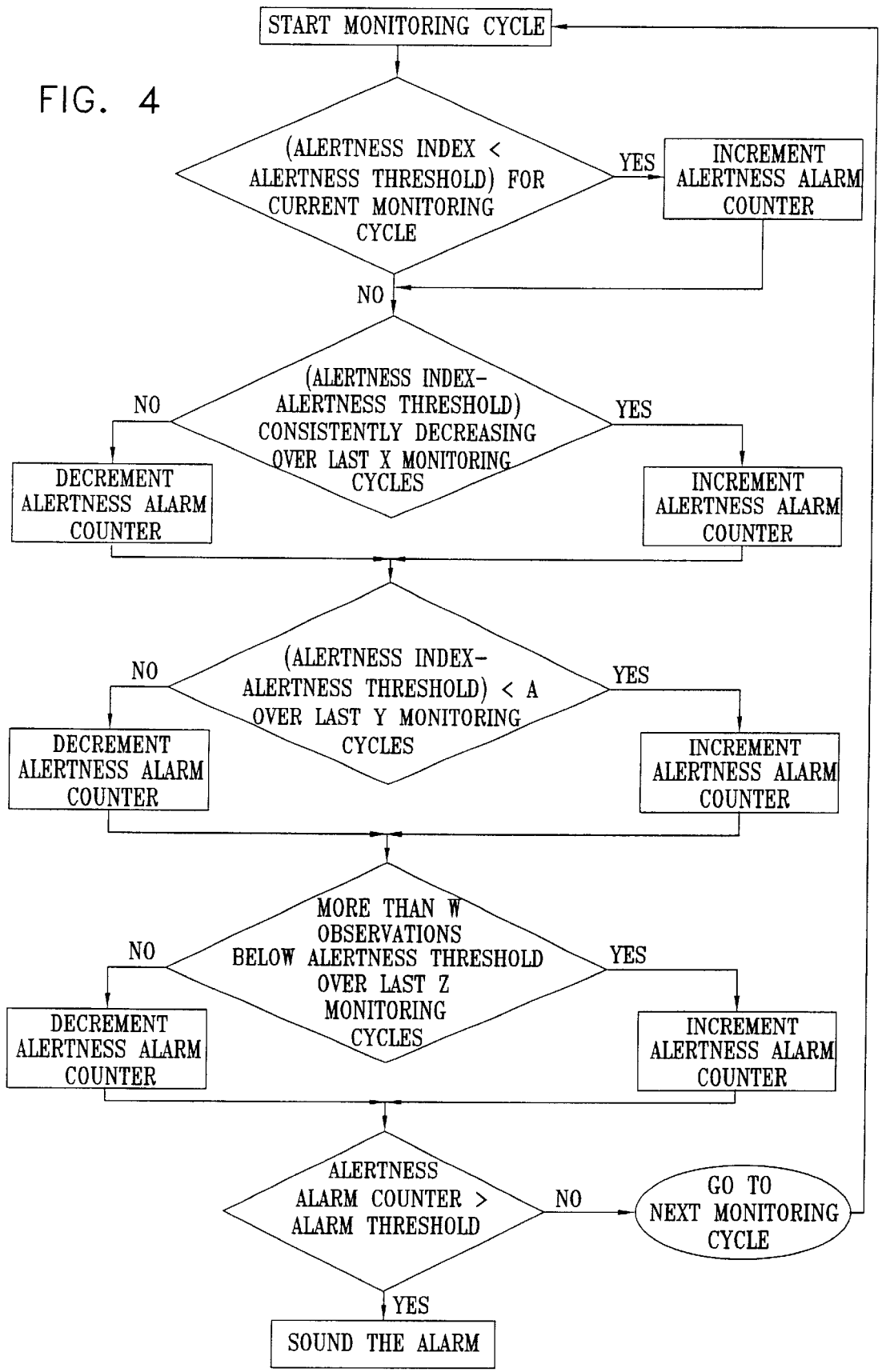
FIG. 4 is a simplified flow chart illustrating application of alertness criteria to driving samples in accordance with a preferred embodiment of the present invention.

A typical algorithm believed suitable for this purpose is described hereinbelow with reference to FIG. 4.

Figure 3B:
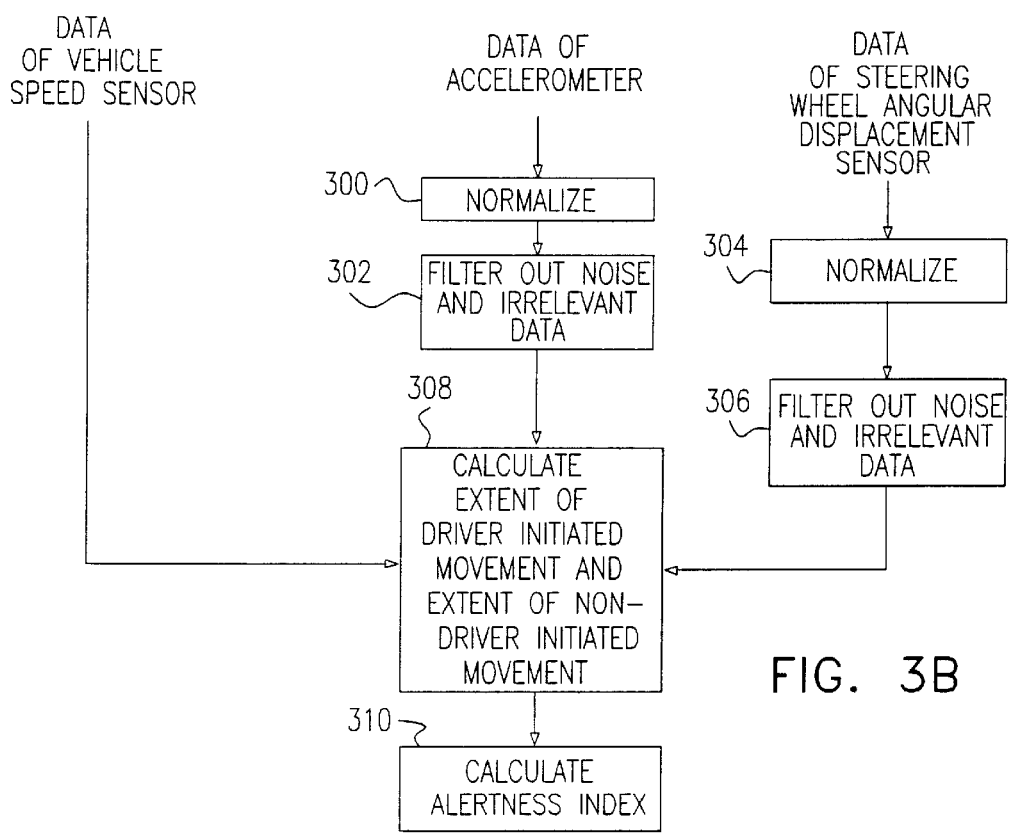
FIG. 3B is a simplified flow chart of the functionality of FIGS. 1A and 1B in accordance with another preferred embodiment of the present invention.

Reference is now made to FIG. 3B, which is a simplified flow chart illustrating the functionality of FIGS. 1A and 1B in accordance with another preferred embodiment of the present invention. Generally speaking, the embodiment of FIG. 3B differs from that of FIG. 3A in that data from an accelerometer, such as the lateral component of data from an acceleration sensor 130 (FIG. 2) fixed to the chassis of a vehicle, is employed instead of data from a road wheel influenced displacement sensor. It is appreciated that as a further alternative, the data from both a road wheel influenced displacement sensor and from an accelerometer may be employed. It is also appreciated that a vertical component from an accelerometer may be employed to represent non-driver initiated movement.

It is appreciated that the term "displacement" as used throughout may, where suitable, refer to either or both of linear and angular displacements. In the case of steering wheel movement, the sensed displacement is angular displacement. In the case of road wheel displacement, either or both of angular displacement of the road wheel itself and linear displacement of elements coupled thereto may be sensed.

As seen in FIG. 3B, data from an accelerometer, such as acceleration sensor 130 (FIG. 2), is normalized, at block 300, preferably to eliminate variations in measurements resulting from differences in the magnitudes and dimensions of movements sensed by different sensors. The output of block 300 is then filtered, at block 302, to remove noise.

Data from a steering wheel influenced angular displacement sensor, such as either of sensors 122 and 124 (FIG. 2), is normalized, at block 304, preferably to eliminate variations in measurements resulting from differences in the magnitudes of the movement sensed by different sensors. The output of block 304 is then filtered, at block 306, to remove noise.

The extents of driver initiated movement and non-driver initiated movement are calculated at block 308, based on inputs received from blocks 302 and 306 as well as input from a vehicle speed sensor 134 (FIG. 2) of vehicle 100 (FIG. 2).

This calculation preferably employs the following equations:

$$m_1 = k_1\alpha + k_2 a_y + k_3\dot{\alpha} + k_4\dot{a}_y + k_5\ddot{\alpha} + k_6\ddot{a}_y + k_7\alpha^2 + k_8 a_y^2 + k_9\dot{\alpha}^2 + k_{10}\dot{a}_y^2 \ldots$$

$$m_2 = l_1\alpha + l_2 a_y + l_3\dot{\alpha} + l_4\dot{a}_y + l_5\ddot{\alpha} + l_6\ddot{a}_y + l_7\alpha^2 + l_8 a_y^2 + l_9\dot{\alpha}^2 + l_{10}\dot{a}_y^2 \ldots$$

where:

$m_1$ is the extent of driver initiated movement;

$m_2$ is the extent of non-driver initiated movement;

$\alpha$ is the angular displacement of the steering wheel, represented by the output of block 306;

$\dot{\alpha}$ is the angular velocity of the steering wheel, represented by the first time derivative of the output of block 306;

$\ddot{\alpha}$ is the angular acceleration of the steering wheel, represented by the second time derivative of the output of block 306;

$a_y$ is the lateral acceleration of the vehicle, represented by the output of block 302;

$\dot{a}_y$ is the first time derivative of the output of block 302;

$\ddot{a}_y$ is the second time derivative of the output of block 302;

$k_1 \ldots k_n$ are coefficients, which are typically derived empirically or analytically, $l_1 \ldots l_n$ are coefficients, which are typically derived empirically or analytically The extents $m_1$ and $m_2$ are employed in block 310 to calculate the alertness index for a multiplicity of discrete time periods.

Initially $m_1$ and $m_2$ are each preferably multiplied by a vehicle speed factor, typically received as an input from the vehicle speed sensor 134 of the vehicle 100 (FIG. 2). The multiplication product is preferably integrated over the duration of each discrete time period. The integrals of the multiplication products for $m_1$ and $m_2$ are combined, preferably according to an equation:

$$AI = \frac{\int |m_2 + m_1| v dt}{\int m_2 v dt + C}$$

where:

AI is the alertness index, $m_1$ is the extent of driver initiated movement;

$m_2$ is the extent of non-driver initiated movement;

v is the instantaneous velocity of the vehicle;

t is time;

C is a constant.

The alertness index, as calculated in block 310, is compared over time to an alertness threshold. The relationship between the alertness index and the alertness threshold is preferably continuously monitored, in monitoring cycles repeated typically four times per minute, and the differences between the alertness index and the alertness threshold are noted. These differences are employed in an algorithm which evaluates whether the relationship between the alertness index and the alertness threshold is characteristic of insufficient driver alertness and thus exceeds the alarm threshold.

A typical algorithm believed suitable for this purpose is now described with reference to FIG. 4. In each monitoring cycle, a determination is initially made whether the alertness index falls below the alertness threshold. If so, an alertness alarm counter is incremented, typically by two counts. If, however, the alertness index has not fallen below the alertness threshold, a determination is made whether the alertness index is generally monotonically decreasing over multiple previous monitoring cycles, typically the last 40 monitoring cycles. If so, the alertness alarm counter is incremented, typically by one count. If not, the alertness alarm counter preferably is decremented, typically by one count.

A determination is also preferably made as to whether the alertness index is in uncomfortably close proximity to the alertness threshold over an extended period of time, typically the last 120 monitoring cycles. If so, the alertness alarm counter is incremented, typically by one count. If not, the alertness alarm counter preferably is decremented, typically by one count.

Preferably, a determination is made as to whether the alertness index has fallen below the alertness threshold more than a predetermined number of times within a predetermined number of past monitoring cycles. Typically, if the alertness index has fallen below the alertness threshold more than six times within the last 120 monitoring cycles, the alertness alarm counter is incremented, typically by one count. If not, the alertness alarm counter is decremented, typically by one count.

It is appreciated that any other suitable determinations may be made and that any of the above determinations need not necessarily be made in order to determine whether an alertness alarm count, maintained by the alertness alarm counter, exceeds the alarm threshold, occasioning a driver sensible alarm output via driver alertness alarm 136 (FIG. 2), typically an audio alarm, but optionally an audio and visual alarm.

Reference is now made to FIGS. 5A and 5B, which are simplified pictorial illustrations of a system and methodology for determining the alertness of a driver of a motor vehicle in accordance with another preferred embodiment of the present invention, respectively illustrating operation when a driver is alert and when a driver is not alert.

As seen in FIGS. 5A and 5B, a determination of the alertness of the driver is made based on a statistical relationship between at least one characteristic of driver initiated movements of at least one part of a motor vehicle and at least one characteristic of non-driver initiated movements of at least one part of a motor vehicle.

A typical driver initiated movement includes controlled movements of the motor vehicle, as for example by the driver turning the steering wheel. A typical non-driver initiated movement of the motor vehicle includes uncontrolled movements of the motor vehicle, resulting for example from the car encountering an uneven section of the road or a gust of wind or the vehicle having unbalanced wheels.

In the preferred embodiment of the invention illustrated in FIGS. 5A and 5B, the at least one characteristic of both driver initiated movements and of non-driver initiated movements is extent. The use of the term "extent", when used with "driver initiated movements" and "non-driver initiated movements", is intended to convey measures of such movements. This measure may be derived in one or more different ways.

It is appreciated that alternatively different characteristics or metrics may be employed for driver initiated movements and for non-driver initiated movements.

As will be described hereinbelow, for the purposes of the present invention, extent may be one or more of at least the following parameters for driver initiated movements:

the integrated magnitude of the driver initiated movements;

the RMS average of the magnitude of the driver initiated movements;

the number of peaks of the driver initiated movements per unit time.

Likewise, extent may be one or more of at least the following parameters for non-driver initiated movements:

the integrated magnitude of the non-driver initiated movements;

the RMS average of the magnitude of the non-driver initiated movements;

the number of peaks of the non-driver initiated movements per unit time.

Alternatively or additionally extent may involve one or more additional parameters. The term "magnitude" as used in the present application may refer to the amount of movement, irrespective of whether that movement is linear movement, angular movement or a combination thereof. Additionally, the term "magnitude" as used in the present application may also refer to a mathematical combination of the movement and another parameter, such as the vehicle speed.

The "THRESHOLD" lines shown in FIGS. 5A and 5B define a predetermined relationship between driver initiated movements and non-driver initiated movements and shows the minimum extent of the driver initiated movements expected for the corresponding extent of non-driver initiated movements, which may be typically measured for a series of alert drivers or, alternatively, may be typically established for specific alert drivers.

In practice, the threshold is preferably determined by correlating a statistically valid sampling of the results of the measuring the driver alertness, see for example the data presented in FIG. 8, with acceptable levels of driver alertness as measured by external means, such as visual records of the appearance of the driver or outputs of various biometric sensors. In setting the threshold, typically care is taken not to provide false alarms unnecessarily, which would result in driver dissatisfaction and refusal to use the system. In practice, a threshold is determined or selectable, which does not fail to provide an alarm when the driver is not sufficiently alert.

Turning to FIG. 5A, it is appreciated that operation of a motor vehicle by an alert driver is preferably characterized in that for at least a predetermined majority of a multiplicity of different time periods, a metric of the extent of driver initiated movements at least equals a corresponding metric of the extent of non-driver initiated movements.

FIG. 5B shows that corresponding operation of a motor vehicle by an non-alert driver is preferably characterized in that for at least a predetermined majority of a multiplicity of different time periods, a metric of the extent of driver initiated movements does not at least equal a corresponding metric of the extent of non-driver initiated movements.

Thus, it may be understood that, for example, when a driver is alert, as the magnitude of non-driver initiated movement increases, the frequency of occurrence of driver initiated movement should increase generally correspondingly.

Figure 6A:
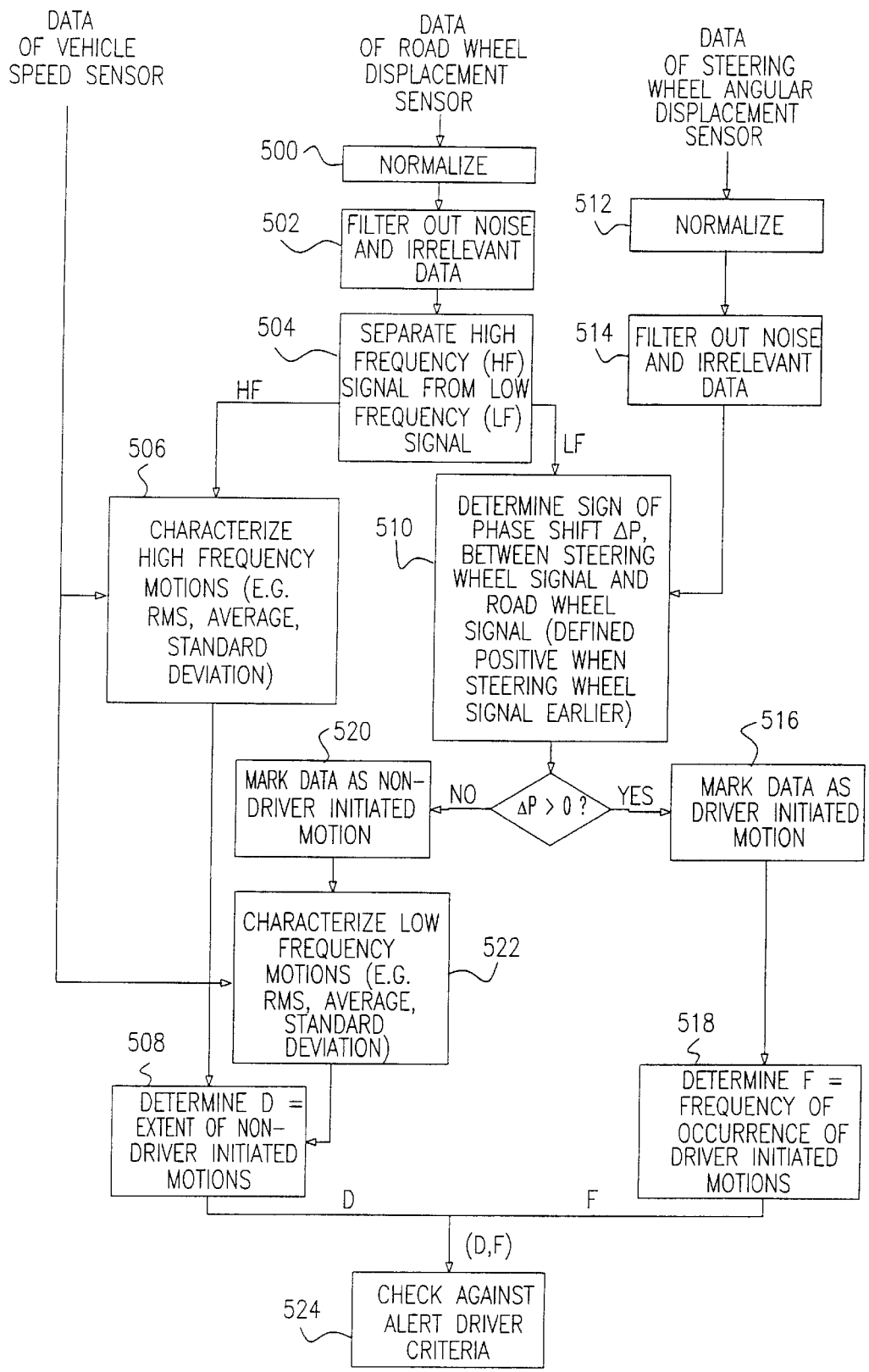
FIG. 6A is a simplified flow chart of the functionality of FIGS. 5A and 5B in accordance with one preferred embodiment of the present invention.

Reference is now made to FIG. 6A, which is a simplified flow chart illustrating the functionality of FIGS. 5A and 5B in accordance with one preferred embodiment of the present invention. As seen in FIG. 6A, data from a road wheel influenced displacement sensor, such as either of sensors 126 and 128 (FIG. 2), is normalized, at block 500, preferably to eliminate variations in measurements resulting from differences in the magnitudes of movement sensed by different sensors. Typical normalized data from the road wheel sensor 128 (FIG. 2), as a function of time, appear as a solid line in trace A1 of FIG. 7A, trace B1 of FIG. 7B and trace C1 of FIG. 7C.

It is appreciated that the term "displacement" as used throughout may, where suitable, refers to either or both of linear and angular displacements. In the case of steering wheel movement, the sensed displacement is angular displacement. In the case of road wheel displacement, either or both of angular displacement of the road wheel itself and linear displacement of elements coupled thereto may be sensed.

The output of block 500 is then filtered, at block 502, to remove noise, which in this case preferably includes all signal components having frequencies in excess of approximately 10 Hz. Typical normalized and filtered data from the road wheel sensor 128 (FIG. 2), as a function of time, appear as a solid line in trace A2 of FIG. 7A, trace B2 of FIG. 7B and trace C2 of FIG. 7C.

The output of block 502 is split into high and low frequency components, preferably above and below 4 Hz, as indicated in block 504. The high frequency component of typical normalized and filtered data from the road wheel sensor 128 (FIG. 2), as a function of time, appears as trace A3 of FIG. 7A, trace B3 of FIG. 7B and trace C3 of FIG. 7C. The low frequency component of typical normalized and filtered data from sensor 128 (FIG. 2), as a function of time, appear as a solid line in each of trace A4 of FIG. 7A, trace B4 of FIG. 7B and trace C4 of FIG. 7C.

It is appreciated that the high frequency component, namely, the component above 4 Hz, is typical of the non-driver initiated movements. However, the component below 4 Hz may include both driver initiated movements and non-driver initiated movements The high frequency component output of block 504 is further processed, together with the data of the vehicle sensor 134 (FIG. 2), as indicated in a block 506, to further characterize this component. The functionality of block 506 may include one or more of calculating RMS values, average values, and standard deviations of the high frequency component, typically coupled with the data from the vehicle speed sensor 134 (FIG. 2), over successive time periods, three of which are represented by respective FIGS. 7A, 7B and 7C.

The output of block 506 is employed to determine the extent of non-driver initiated movement, as indicated in a block 508.

The low frequency component output of block 504 is further processed as indicated in a block 510, as is described hereinbelow.

Data from a steering wheel influenced angular displacement sensor, such as either of sensors 122 and 124 (FIG. 2), is normalized, at block 512, preferably to eliminate variations in measurements resulting from differences in the magnitudes of the movement sensed by different sensors. Typical normalized data from the steering wheel sensor 122 (FIG. 2), as a function of time, appear as a dashed line in trace A1 of FIG. 7A, trace B1 of FIG. 7B and trace C1 of FIG. 7C.

The output of block 512 is then filtered, at block 514, to remove noise, which in this case preferably includes all signal components having frequencies in excess of approximately 10 Hz. Typical normalized and filtered data from the steering wheel sensor 122 (FIG. 2), as a function of time, appear as a dashed line in trace A2 of FIG. 7A, trace B2 of FIG. 7B and trace C2 of FIG. 7C.

Figure 7A:
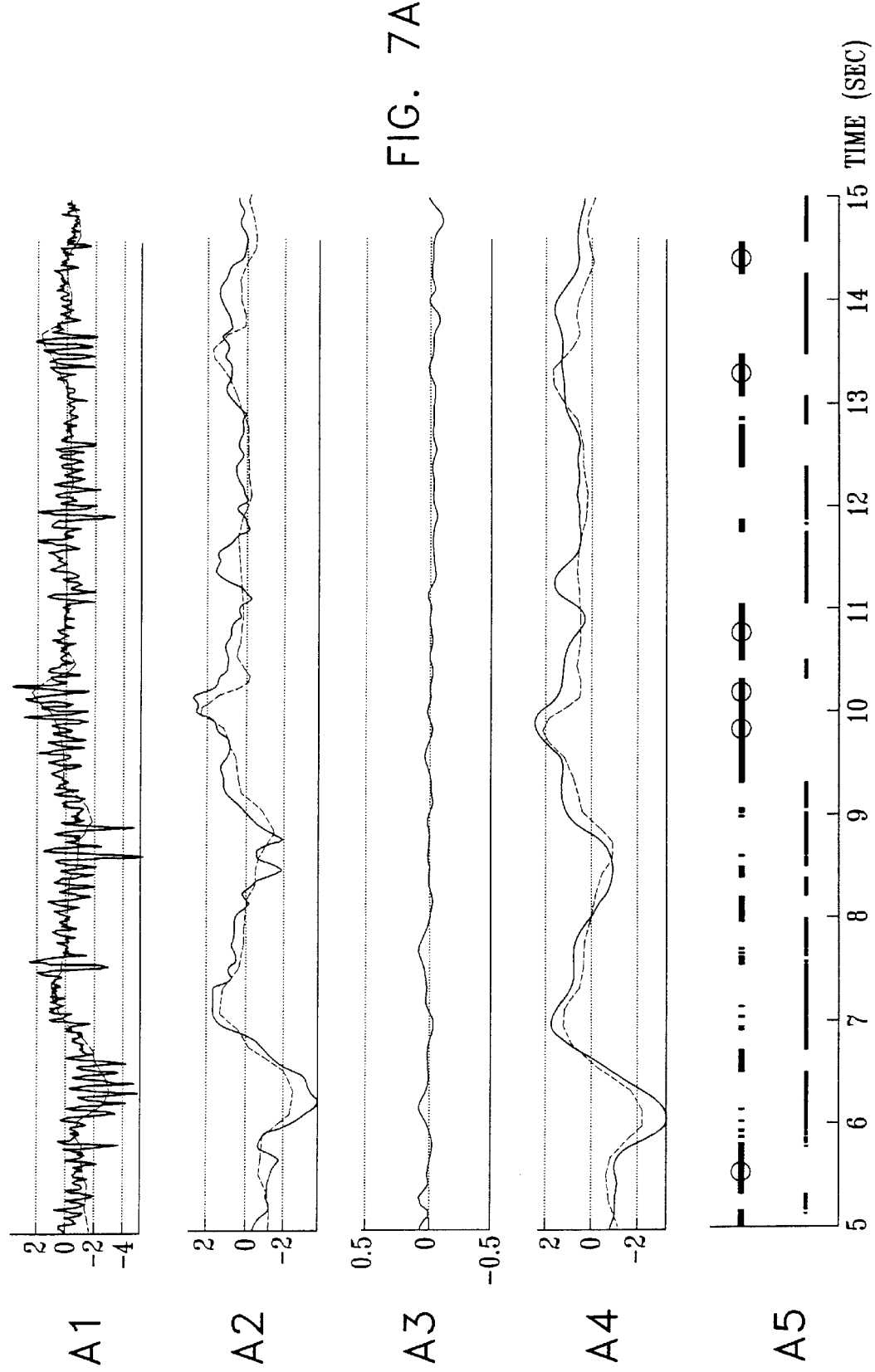
FIG. 7A is an illustration of the functionality of FIGS. 5A and 5B in accordance with one preferred embodiment of the present invention over a first time period corresponding to a first set of driving conditions and driver conditions.
Figure 7B:
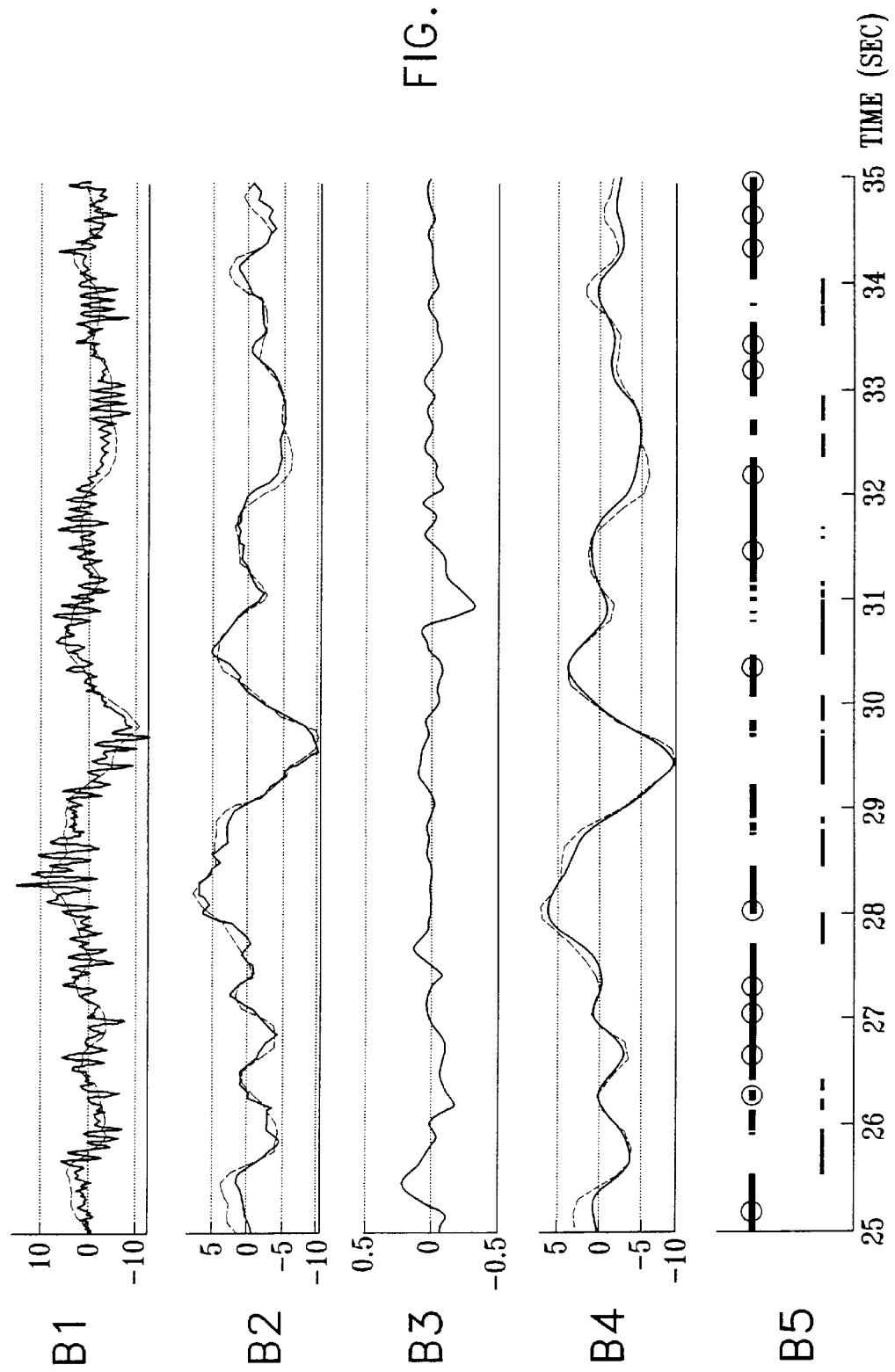
FIG. 7B is an illustration of the functionality of FIGS. 5A and 5B in accordance with one preferred embodiment of the present invention over a second time period corresponding to a second set of driving conditions and driver conditions.
Figure 7C:
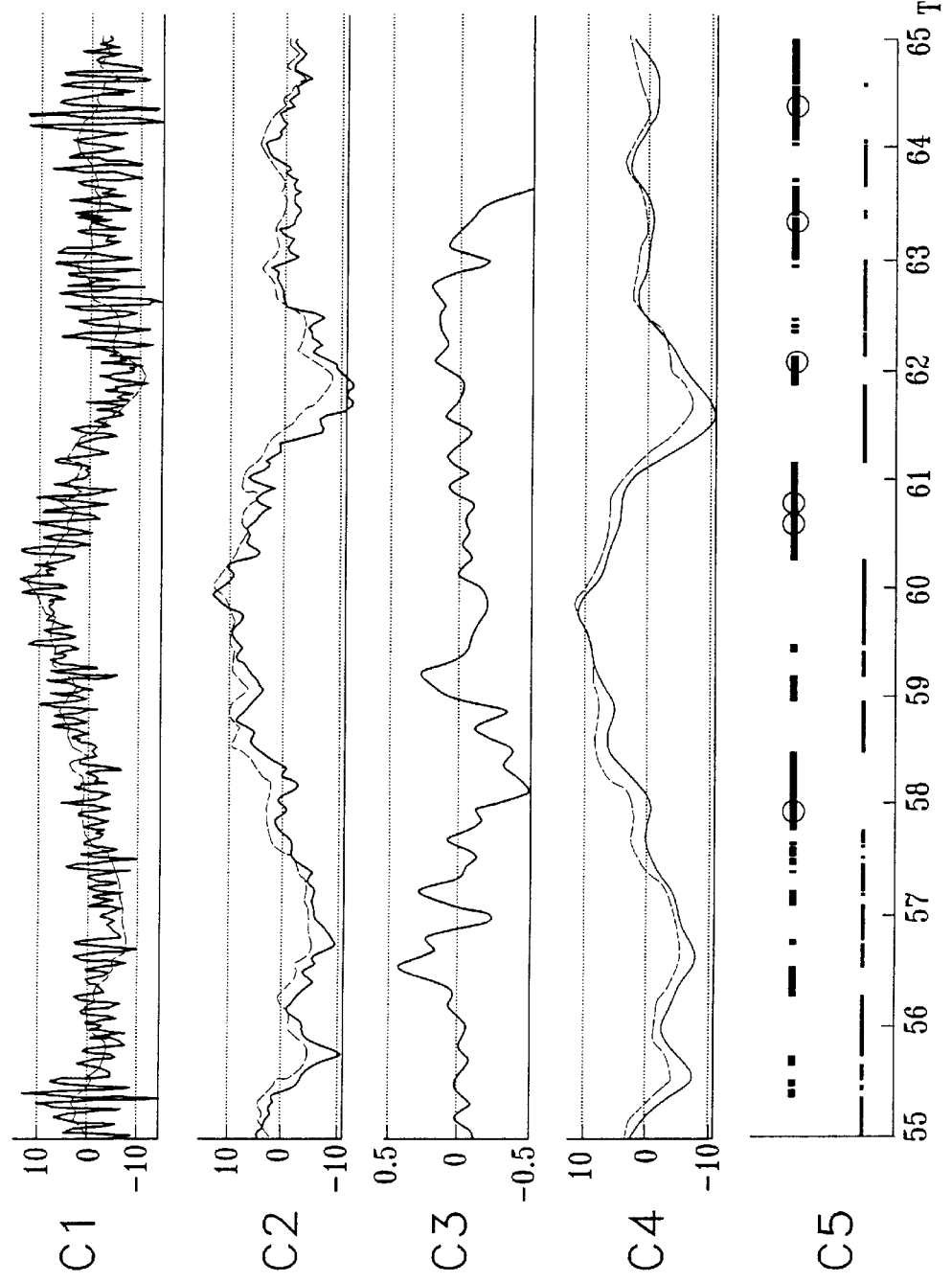
FIG. 7C is an illustration of the functionality of FIGS. 5A and 5B in accordance with one preferred embodiment of the present invention over a third time period corresponding to a third set of driving conditions and driver conditions.

The output of block 514 is preferably supplied to block 510, which is operative to determine the sign of the phase difference between the output of block 514 and the output of block 504, which are respectively represented by the dashed and solid lines in trace A4 of FIG. 7A, trace B4 of FIG. 7B and trace C4 of FIG. 7C for each of a multiplicity of discrete time durations. This phase difference is defined to be positive, when the output of block 514, representing the steering wheel influenced movement, leads the output of block 504, representing the low frequency component of the road wheel influenced movement.

There exist various known techniques for determining the phase difference, any suitable one of which may be employed herein. The particular technique employed does not form part of the present invention.

When the phase difference is positive the relevant time duration to which that data relates is indicated, at block 516, to be driver initiated movement duration, indicated by a relatively thick line in trace A5 of FIG. 7A, trace B5 of FIG. 7B and trace C5 of FIG. 7C. The data representing driver initiated movement is then analyzed, at block 518, typically to determine the frequency of occurrence of driver initiated movements, which is an indication of the extent of driver initiated movements. Alternatively or additionally to determining the frequency of occurrence of driver initiated movements, any other suitable metric of the extent of driver initiated movements may be employed.

The frequency of occurrence of driver initiated movements may be determined by counting the number of extrema points in the dashed line appearing in trace A4 of FIG. 7A, trace B4 of FIG. 7B and trace C4 of FIG. 7C during the driver initiated movement durations corresponding to the relatively thick lines in trace A5 of FIG. 7A, trace B5 of FIG. 7B and trace C5 of FIG. 7C. These extrema points are indicated by circles drawn on the relatively thick line in trace A5 of FIG. 7A, trace B5 of FIG. 7B and trace C5 of FIG. 7C.

When the phase difference is negative, the relevant time duration to which that data relates is indicated, at block 520 to be non-driver initiated movement duration, indicated by a relatively thin line in trace A5 of FIG. 7A, trace B5 of FIG. 7B and trace C5 of FIG. 7C The data representing non-driver initiated movement is then analyzed, at block 522, in order to further characterize this data. The functionality of block 522 may include one or more of calculating RMS values, average values, and standard deviations of the low frequency component, typically coupled with the data of the vehicle speed sensor (FIG. 2), over successive time periods, three of which are represented by respective FIGS. 7A, 7B and 7C.

The output of block 522 is supplied to block 508 along with the output from block 506 in order to determine the extent of non-driver initiated movement. The functionality of block 508 may be summarized as providing a metric indicating the level of non-driver initiated movement over successive time periods, three of which are represented by respective FIGS. 7A, 7B and 7C.

The level of non-driver initiated movement may be expressed in a number of possible ways, such as a linear or non-linear combination of low frequency and high frequency data, which reflects one or both of magnitude of such movement and frequency of direction change of such movement. Preferably, a linear combination of the low frequency and high frequency data is employed and reflects both magnitude and frequency of direction change.

The outputs of blocks 508 and 518 are employed in block 524 to determine whether a driver meets alertness criteria, as will be described hereinbelow with reference to FIGS. 8 and 9.

Reference is now made to FIG. 6B, which is a simplified flow chart illustrating the functionality of FIGS. 5A and 5B in accordance with another preferred embodiment of the present invention Generally speaking, the embodiment of FIG. 6B differs from that of FIG. 6A in that the embodiment of FIG. 6B does not separate or separately employ the high frequency portion of the output of a road wheel displacement sensor.

As seen in FIG. 6B, data from a road wheel influenced displacement sensor, such as either of sensors 126 and 128 (FIG. 2), is normalized, at block 600, preferably to eliminate variations in measurements resulting from differences in the magnitudes of movement sensed by different sensors. Typical normalized data from the road wheel sensor 128 (FIG. 2), as a function of time, appear as a solid line in trace A1 of FIG. 7A, trace B1 of FIG. 7B and trace C1 of FIG. 7C.

The output of block 600 is then filtered, at block 602, to remove noise and other irrelevant data, which in this case preferably includes all signal components having frequencies in excess of approximately 4 Hz. Typical normalized and filtered data from the road wheel sensor 128 (FIG. 2), as a function of time, appear as a solid line in trace A4 of FIG. 7A, trace B4 of FIG. 7B and trace C4 of FIG. 7C.

The output of block 602 is further processed as indicated in a block 610, as is described hereinbelow.

Data from a steering wheel influenced angular displacement sensor, such as either of sensors 122 and 124 (FIG. 2), is normalized, at block 612, preferably to eliminate variations in measurements resulting from differences in the magnitudes of movement sensed by different sensors Typical normalized data from the steering wheel sensor 122 (FIG. 2), as a function of time, appear as a dashed line in trace A1 of FIG. 7A, trace B1 of FIG. 7B and trace C1 of FIG. 7C.

The output of block 612, is then filtered, at block 614, to remove noise, which in this case preferably includes all signal components having frequencies in excess of approximately 4 Hz. Typical normalized and filtered data from the steering wheel sensor 122 (FIG. 2), as a function of time, appear as a dashed line in trace A2 of FIG. 7A, trace B2 of FIG. 7B and trace C2 of FIG. 7C.

The output of block 614 is preferably supplied to block 610, which is operative to determine the sign of the phase difference between the output of block 614 and the output of block 602, which are respectively represented by the dashed and solid lines in trace A4 of FIG. 7A, trace B4 of FIG. 7B and trace C4 of FIG. 7C for each of a multiplicity of discrete time durations. This phase difference is defined to be positive, when the output of block 614, representing the steering wheel influenced movement, leads the output of block 602, representing the road wheel influenced movement.

There exist various known techniques for determining the phase difference, any suitable one of which may be employed herein. The particular technique employed does not form part of the present invention.

When the phase difference is positive, the relevant time duration to which that data relates is indicated, at block 616, to be driver initiated movement duration, indicated by a relatively thick line in trace A5 of FIG. 7A, trace B5 of FIG. 7B and trace C5 of FIG. 7C. The data representing driver initiated movement is then analyzed, at block 618, typically to determine the frequency of occurrence of driver initiated movements, which is an indication of the extent of driver initiated movements. Alternatively or additionally to determining the frequency of occurrence of driver initiated movements, any other suitable metric of the extent of driver initiated movements may be employed.

The frequency of occurrence of driver initiated movements may be determined by counting the number of extrema points in the dashed line appearing in trace A4 of FIG. 7A, trace B4 of FIG. 7B and trace C4 of FIG. 7C during the driver initiated movement durations corresponding to the relatively thick lines in trace A5 of FIG. 7A, trace B5 of FIG. 7B and trace C5 of FIG. 7C. These extrema points are indicated by circles drawn on the relatively thick line in trace A5 of FIG. 7A, trace B5 of FIG. 7B and trace C5 of FIG. 7C.

When the phase difference is negative, the relevant time duration to which that data relates is indicated, at block 620, to be non-driver initiated movement duration, indicated by a relatively thin line in trace A5 of FIG. 7A, trace B5 of FIG. 7B and trace C5 of FIG. 7C. The data representing non-driver initiated movement is then analyzed, at block 622, in order to further characterize this data. The functionality of block 622 may include one or more of calculating RMS values, average values, and standard deviations of the low frequency component, typically coupled with the data of the vehicle speed sensor 134 (FIG. 2), over successive time periods, three of which are represented by respective FIGS. 7A, 7B and 7C.

The output of block 622 is supplied to block 608 in order to determine the extent of non-driver initiated movement. The functionality of block 608 may be summarized as providing a metric indicating the level of non-driver initiated movement over successive time periods, three of which are represented by respective FIGS. 7A, 7B and 7C.

The level of non-driver initiated movement may be expressed in a number of possible ways, such as a linear or non-linear combination of data, which reflects one or both of magnitude of such movement and frequency of direction change of such movement. Preferably, a linear combination of the data is employed and reflects both magnitude and frequency of direction change.

The outputs of blocks 608 and 618 are employed in a block 624 to determine whether a driver meets alertness criteria, as will be described hereinbelow with reference to FIGS. 8 and 9.

Figure 6C:
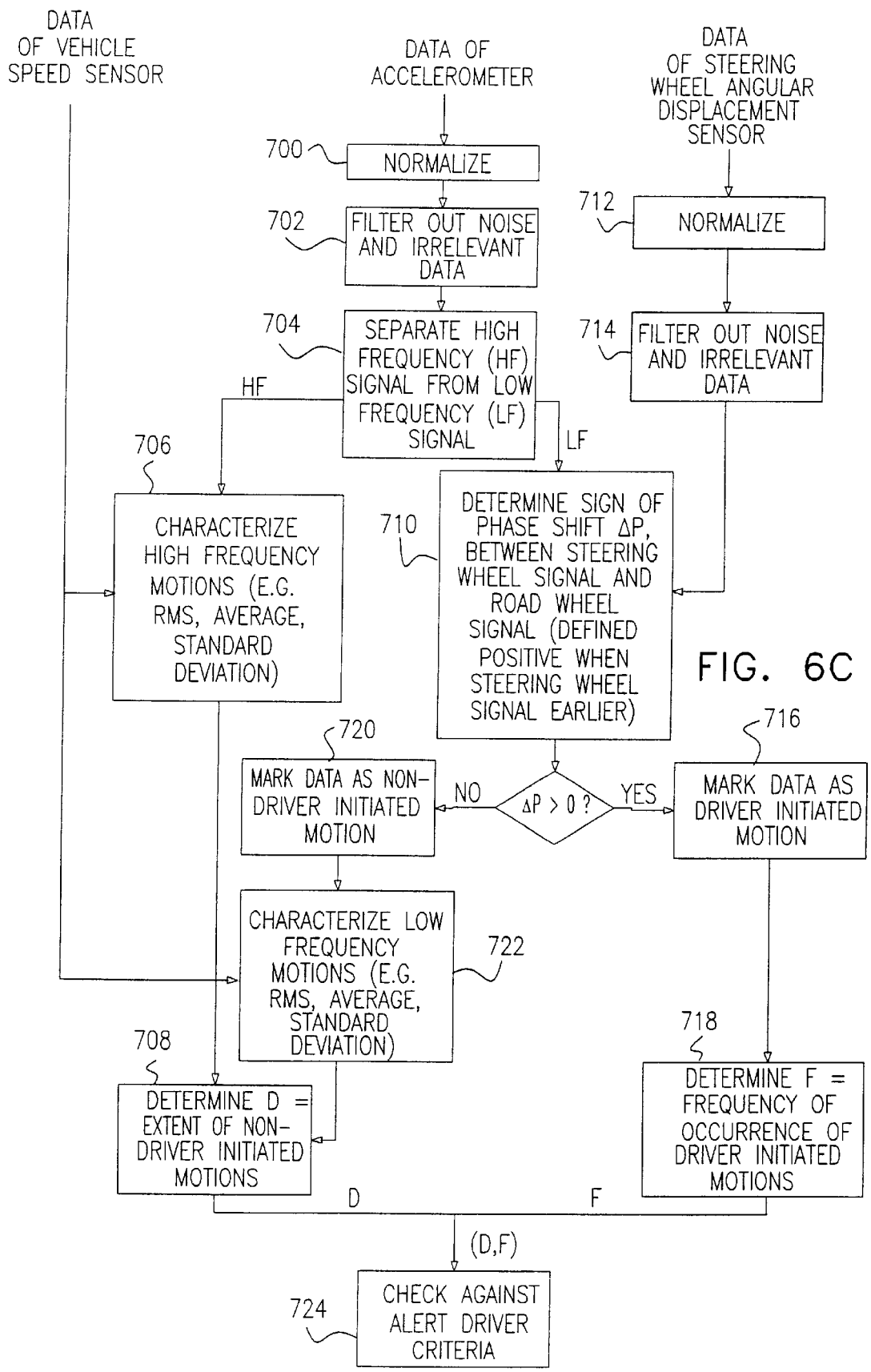
FIG. 6C is a simplified flow chart of the functionality of FIGS. 5A and 5B in accordance with yet another preferred embodiment of the present invention.

Reference is now made to FIG. 6C, which is a simplified flow chart illustrating the functionality of FIGS. 5A and 5B in accordance with still another preferred embodiment of the present invention. Generally speaking, the embodiment of FIG. 6C differs from that of FIG. 6A in that data from an accelerometer, such as the lateral component of data from an acceleration sensor 130 (FIG. 2) fixed to the chassis of a vehicle, is employed instead of data from a road wheel influenced displacement sensor It is appreciated that as a further alternative, the data from both a road wheel influenced displacement sensor and from an accelerometer may be employed. It is also appreciated that a vertical component from an accelerometer may be employed to represent non-driver initiated movement.

As seen in FIG. 6C, data from an accelerometer, such as acceleration sensor 130 (FIG. 2), is normalized, at block 700, preferably to eliminate variations in measurements resulting from differences in the magnitudes and dimensions of movements sensed by different sensors. Typical normalized data from the lateral component of the output of acceleration sensor 130 (FIG. 2), as a function of time, appear as a solid line in trace A1 of FIG. 7A, trace B1 of FIG. 7B and trace C1 of FIG. 7C.

The output of block 700 is then filtered, at block 702, to remove noise, which in this case preferably includes all signal components having frequencies in excess of approximately 10 Hz. Typical normalized and filtered data from the lateral component of the output of acceleration sensor 130 (FIG. 2), as a function of time, appear as a solid line in trace A2 of FIG. 7A, trace B2 of FIG. 7B and trace C2 of FIG. 7C.

The output of block 702 is split into high and low frequency components, preferably above and below 4 Hz, as indicated in block 704. The high frequency component of typical normalized and filtered data from the lateral component of the output of acceleration sensor 130 (FIG. 2), as a function of time, appear as trace A3 of FIG. 7A, trace B3 of FIG. 7B and trace C3 of FIG. 7C. The low frequency component of typical normalized and filtered data from the lateral component of the output of acceleration sensor 130 (FIG. 2), as a function of time, appear as a solid line in each of trace A4 of FIG. 7A, trace B4 of FIG. 7B and trace C4 of FIG. 7C.

The high frequency component output of block 704 is further processed, typically with the data from the vehicle speed sensor 134 (FIG. 2), as indicated in a block 706, to further characterize this component. The functionality of block 706 may include one or more of calculating RMS values, average values, and standard deviations of the high frequency component, typically with the data from the vehicle speed sensor 134 (FIG. 2), over successive time periods, three of which are represented by respective FIGS. 7A, 7B and 7C. Optionally, a vertical component of the output of acceleration sensor 130 (FIG. 2) may also be employed in block 706.

The output of block 706 is employed to determine the extent of non-driver initiated movement, as indicated in a block 708.

The low frequency component output of block 704 is further processed as indicated in a block 710, as is described hereinbelow.

Data from a steering wheel influenced angular displacement sensor, such as either of sensors 122 and 124 (FIG. 2), is normalized, at block 712, preferably to eliminate variations in measurements resulting from differences in the magnitudes of movement sensed by different sensors. Typical normalized data from the steering wheel sensor 122 (FIG. 2), as a function of time, appear as a dashed line in trace A1 of FIG. 7A, trace B1 of FIG. 7B and trace C1 of FIG. 7C.

The output of block 712 is then filtered, at block 714, to remove noise, which in this case preferably includes all signal components having frequencies in excess of approximately 10 Hz Typical normalized and filtered data from the steering wheel sensor 122 (FIG. 2), as a function of time, appear as a dashed line in trace A2 of FIG. 7A, trace B2 of FIG. 7B and trace C2 of FIG. 7C.

The output of block 714 is preferably supplied to block 710, which is operative to determine the sign of the phase difference between the output of block 714 and the output of block 704, which are respectively represented by the dashed and solid lines in trace A4 of FIG. 7A, trace B4 of FIG. 7B and trace C4 of FIG. 7C for each of a multiplicity of discrete time durations. This phase difference is defined to be positive, when the output of block 714, representing the steering wheel influenced movement, leads the output of block 704, representing the low frequency component of the road wheel influenced movement.

There exist various known techniques for determining the phase difference, any suitable one of which may be employed herein. The particular technique employed does not form part of the present invention.

When the phase difference is positive, the relevant time duration to which that data relates is indicated, at block 716, to be driver initiated movement duration, indicated by a relatively thick line in trace A5 of FIG. 7A, trace B5 of FIG. 7B and trace C5 of FIG. 7C. The data representing driver initiated movement is then analyzed, at block 718, typically to determine the frequency of occurrence of driver initiated movements, which is an indication of the extent of driver initiated movements. Alternatively or additionally to determining the frequency of occurrence of driver initiated movements, any other suitable metric of the extent of driver initiated movements may be employed.

The frequency of occurrence of driver initiated movements may be determined by counting the number of extrema points in the dashed line appearing in trace A4 of FIG. 7A, trace B4 of FIG. 7B and trace C4 of FIG. 7C during the driver initiated movement durations corresponding to the relatively thick lines in trace A5 of FIG. 7A, trace B5 of FIG. 7B and trace C5 of FIG. 7C. These extrema points are indicated by circles drawn on the relatively thick line in trace A5 of FIG. 7A, trace B5 of FIG. 7B and trace C5 of FIG. 7C.

When the phase difference is negative, the relevant time duration to which that data relates is indicated, at block 720, to be non-driver initiated movement duration, indicated by a relatively thin line in trace A5 of FIG. 7A, trace B5 of FIG. 7B and trace C5 of FIG. 7C. The data representing non-driver initiated movement is then analyzed, at block 722, in order to further characterize this data The functionality of block 722 may include one or more of calculating RMS values, average values, and standard deviations of the low frequency component, typically with the data from the vehicle speed sensor 134 (FIG. 2), over successive time periods, three of which are represented by respective FIGS. 7A, 7B and 7C.

The output of block 722 is supplied to block 708 along with the output from block 706 in order to determine the extent of non-driver initiated movement. The functionality of block 708 may be summarized as providing a metric indicating the level of non-driver initiated movement over successive time periods, three of which are represented by respective FIGS. 7A, 7B and 7C.

The level of non-driver initiated movement may be expressed in a number of possible ways, such as a linear or non-linear combination of low frequency and high frequency data, which reflects one or both of magnitude of such movement and frequency of direction change of such movement. Preferably, a linear combination of the low frequency and high frequency data is employed and reflects both magnitude and frequency of direction change.

The outputs of blocks 708 and 718 are employed in a block 724 to determine whether a driver meets alertness criteria, as will be described hereinbelow with reference to FIGS. 8 and 9.

It is appreciated that in the embodiments of FIGS. 6A and 6B, the output of acceleration sensor 130 (FIG. 2) may be employed in place of or in addition to the output of a road-wheel influenced angular displacement sensor.

Figure 9:
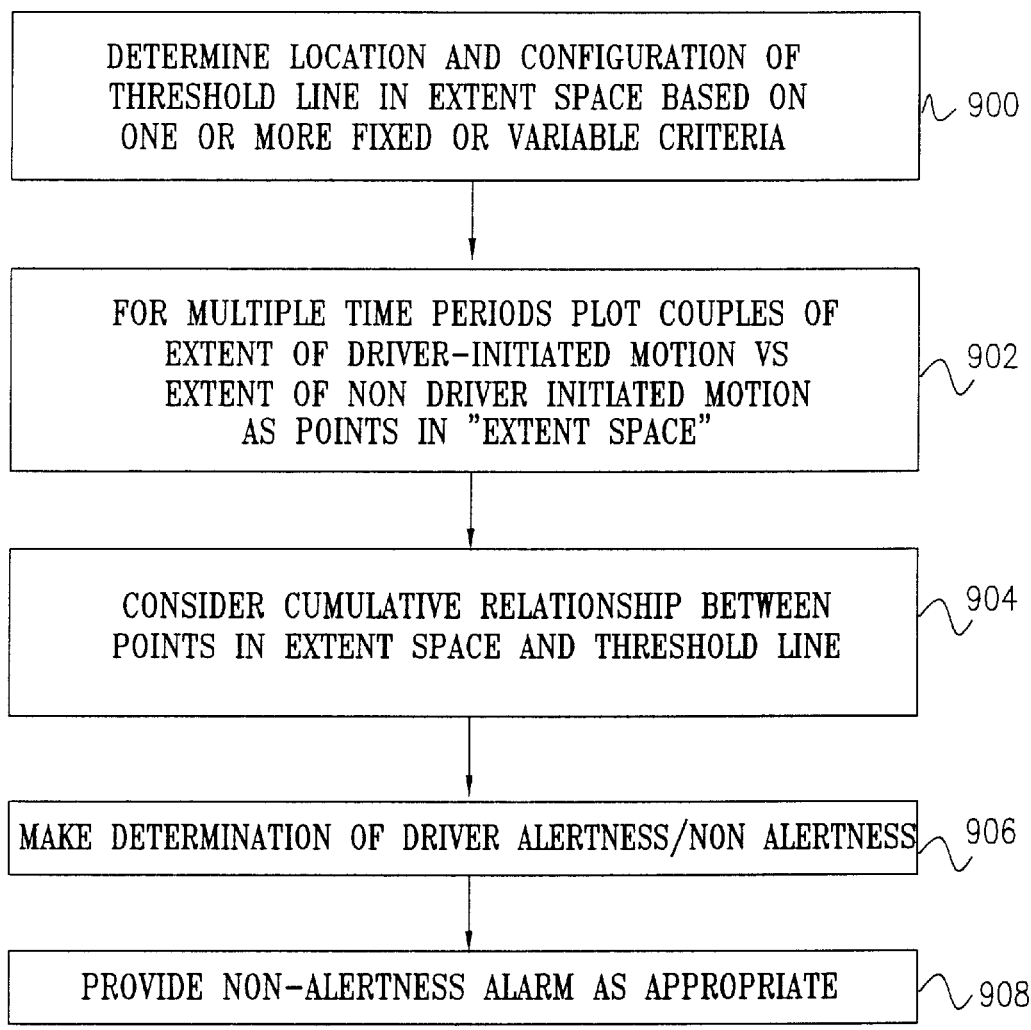
FIG. 9 is a simplified flow chart illustrating application of alertness criteria to driving samples in accordance with a preferred embodiment of the present invention.

Reference is now made to FIGS. 8 and 9, which illustrate utilization of determinations of extent of driver initiated and non-driver initiated movements for determining driver alertness. Typically, the Threshold Line is initially determined as discussed hereinabove (step 900, FIG. 9).

Preferably, as seen in FIG. 8, for each given time period, such as the three time periods represented by FIGS. 7A, 7B and 7C, the extent of driver initiated movement and the extent of non-driver initiated movement are plotted in "Extent Space" (step 902, FIG. 9). Each such time period is represented by a single point in "Extent Space". Thus it may be seen in FIG. 8, that a point 850 represents the extent of driver initiated movement and the extent of non-driver initiated movement for the time period represented by FIG. 7A.

In the embodiments of FIGS. 6A, 6B and 6C, the extent of driver initiated movements is preferably derived from the frequency of their occurrence, as exemplified by the number of circles appearing in traces A5, B5 and C5, respectively, in FIGS. 7A, 7B and 7C.

In the embodiments of FIGS. 6A and 6C, the extent of non-driver initiated movements is preferably derived from the amplitude of the high frequency component of the non-driver initiated movements, as exemplified by the amplitudes appearing in traces A3, B3 and C3, typically combined with the amplitude of the low frequency component of the non-driver initiated movements taken together with other data relating thereto, such as the frequency of occurrence.

In the embodiment of FIG. 6B, the extent of non-driver initiated movements is preferably derived from the amplitude of the low frequency component of the non-driver initiated movements taken together with other data relating thereto, such as the frequency of occurrence.

Referring again to FIG. 8, point 860 represents the extent of driver initiated movement and the extent of non-driver initiated movement for the time period represented by FIG. 7B and point 870 represents the extent of driver initiated movement and the extent of non-driver initiated movement for the time period represented by FIG. 7C.

Similar plots in FIGS. 5A and 5B represent the extent of driver initiated movement and the extent of non-driver initiated movement for a relatively large number of time periods.

As seen in FIGS. 5A, 5B and 8, there appears a threshold line that differentiates couples of the extent of driver initiated movement and the extent of non-driver initiated movement for a given time period and being characteristic of driver alertness (above the line) and non-alertness (below the line).

In reality, this threshold line may be fixed or variable as the result of variations in one or more parameters, including, inter alia, vehicle speed, elapsed duration of trip, known or earlier determined driving characteristics of the driver, travel conditions and type of vehicle.

A determination of driver alertness or non-alertness may be a cumulative determination based on a weighting of the points appearing above and below the threshold line, once a statistically acceptable sample is achieved (steps 904 and 906, FIG. 9) Alternatively or additionally, it may be a determination based on the change in the position of successive points relative to the threshold line and relative to each other as time passes.

Based on the determination of driver alertness or non-alertness made from time to time, an appropriate alarm indication is provided to the driver (step 908, FIG. 9), preferably via alarm 136 (FIG. 2).

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A methodology for determining the alertness of a driver of a motor vehicle comprising:

sensing at least one first movement characteristic of at least a first part of a motor vehicle;

sensing at least one second movement characteristic of at least a second part of said motor vehicle;

employing at least one time relationship between said at least one first movement characteristic and said at least one second movement characteristic in order to sense and to distinguish between driver initiated movements and non-driver initiated movements; and determining the alertness of said driver of said motor vehicle based on at least one relationship between said driver initiated movements and said non-driver initiated movements.

2. A methodology according to claim 1 and wherein said at least one first movement characteristic comprises a steering wheel movement characteristic and said at least one second movement characteristic comprises a road wheel movement characteristic.

3. A methodology according to claim 2 and wherein:

said at least one first movement characteristic is angular displacement of said steering wheel; and said at least one second movement characteristic is a steering angle of at least one road wheel.

4. A methodology according to claim 1 and wherein said at least one first movement characteristic and said at least one second movement characteristic comprise movement characteristics of first and second locations along a steering assembly extending from a steering wheel to at least one road wheel of said motor vehicle.

5. A methodology according to claim 4 and wherein said first and second locations are located respectively at or upstream of and at or downstream of a power steering unit forming part of said steering assembly.

6. A methodology according to claim 5 and wherein said first location is at a steering wheel forming part of said steering assembly.

7. A methodology according to claim 5 and wherein:
said at least one first movement characteristic is displacement; and
said at least one second movement characteristic is displacement.

8. A methodology according to claim 3 and wherein:
said at least one first movement characteristic is displacement; and
said at least one second movement characteristic is displacement.

9. A methodology according to claim 1 and wherein said at least one first movement characteristic comprises a steering assembly movement characteristic and said at least one second movement characteristic comprises a vehicle body movement characteristic.

10. A methodology according to claim 9 and wherein:
said at least one first movement characteristic is displacement; and
said at least one second movement characteristic is acceleration in at least one direction.

11. A methodology according to claim 1 and wherein said at least one first movement characteristic comprises a steering assembly movement characteristic and said at least one second movement characteristic comprises a vehicle chassis movement characteristic.

12. A methodology according to claim 11 and wherein:
said at least one first movement characteristic is displacement; and
said at least one second movement characteristic is acceleration in at least one direction.

13. A methodology according to claim 1 and wherein said determining also employs the speed of the vehicle.

14. A methodology for determining the alertness of a driver of a motor vehicle comprising:
employing at least one time relationship between at least one first movement characteristic of at least a first part of a motor vehicle and at least one second movement characteristic of at least a second part of said motor vehicle in order to sense and to distinguish between driver initiated movements and non-driver initiated movements; and
determining the alertness of said driver of said motor vehicle based on at least one relationship between said driver initiated movements and said non-driver initiated movements.

15. A methodology according to claim 14 and wherein said at least one first movement characteristic comprises a steering wheel movement characteristic and said at least one second movement characteristic comprises a road wheel movement characteristic.

16. A methodology according to claim 15 and wherein:
said at least one first movement characteristic is angular displacement of said steering wheel; and
said at least one second movement characteristic is a steering angle of at least one road wheel.

17. A methodology according to claim 14 and wherein said at least one first movement characteristic and the second movement characteristic comprise movement characteristics of first and second locations along a steering assembly extending from a steering wheel to at least one road wheel of said motor vehicle.

18. A methodology according to claim 17 and wherein said first and second locations are located respectively at or upstream of and at or downstream of a power steering unit forming part of said steering assembly.

19. A methodology according to claim 18 and wherein said first location is at a steering wheel forming part of said steering assembly.

20. A methodology according to claim 18 and wherein:
said at least one first movement characteristic is displacement; and
said at least one second movement characteristic is displacement.

21. A methodology according to claim 17 and wherein:
said at least one first movement characteristic is displacement; and
said at least one second movement characteristic is displacement.

22. A methodology according to claim 14 and wherein said at least one first movement characteristic comprises a steering assembly movement characteristic and said at least one second movement characteristic comprises a vehicle body movement characteristic.

23. A methodology according to claim 22 and wherein:
said at least one first movement characteristic is displacement; and
said at least one second movement characteristic is acceleration in at least one direction.

24. A methodology according to claim 14 and wherein said at least one first movement characteristic comprises a steering assembly movement characteristic and said at least one second movement characteristic comprises a vehicle chassis movement characteristic.

25. A methodology according to claim 24 and wherein:
said at least one first movement characteristic is displacement; and
said at least one second movement characteristic is acceleration in at least one direction.

26. A methodology according to claim 14 and wherein said determining also employs the speed of the vehicle.

27. A methodology for determining the alertness of a driver of a motor vehicle comprising:
sensing at least one characteristic of driver initiated movements of at least one part of a motor vehicle;
sensing at least one characteristic of non-driver initiated movements of at least one part of a motor vehicle; and
determining the alertness of said driver of said motor vehicle based on at least one relationship between said driver initiated movements and said non-driver initiated movements.

28. A methodology according to claim 27 and wherein said at least one characteristic of driver initiated movements is extent.

29. A methodology according to claim 28 and wherein said at least one characteristic of non-driver initiated movements is extent.

30. A methodology according to claim 28 and wherein extent of driver initiated movements includes at least one of:
the integrated magnitude of the driver initiated movements;
the RMS average of the magnitude of the driver initiated movements;
the number of peaks of the driver initiated movements per unit time.

31. A methodology according to claim 27 and wherein said at least one characteristic of non-driver initiated movements is extent.

32. A methodology according to claim 31 and wherein extent of non-driver initiated movements includes at least one of:

the integrated magnitude of the non-driver initiated movements;

the RMS average of the magnitude of the non-driver initiated movements, the number of peaks of the non-driver initiated movements per unit time.

33. A methodology according to claim 27 and wherein said sensing at least one characteristic of driver initiated movements of at least one part of a motor vehicle and said sensing at least one characteristic of non-driver initiated movements of at least one part of a motor vehicle comprise sensing at least one first movement characteristic and sensing, at least one second movement characteristic of said motor vehicle.

34. A methodology according to claim 33 and wherein said at least one first movement characteristic comprises a steering wheel movement characteristic and said at least one second movement characteristic comprises a road wheel movement characteristic.

35. A methodology according to claim 34 and wherein said at least one first movement characteristic and the second movement characteristic comprise movement characteristics of first and second locations along a steering assembly extending from a steering wheel to at least one road wheel of said motor vehicle.

36. A methodology according to claim 35 and wherein said first and second locations are located respectively at or upstream of and at or downstream of a power steering unit forming part of said steering assembly.

37. A methodology according to claim 36 and wherein said first location is at a steering wheel forming part of said steering assembly.

38. A methodology according to claim 36 and wherein:
said at least one first movement characteristic is angular displacement of
said steering wheel; and
said at least one second movement characteristic is a steering angle of at least one road wheel.

39. A methodology according to claim 36 and wherein:
said at least one first movement characteristic is displacement; and
said at least one second movement characteristic is displacement.

40. A methodology according to claim 35 and wherein:
said at least one first movement characteristic is displacement; and
said at least one second movement characteristic is displacement.

41. A methodology according to claim 34 and wherein said at least one first movement characteristic comprises a steering assembly movement characteristic and said at least one second movement characteristic comprises a vehicle body movement characteristic.

42. A methodology according to claim 41 and wherein:
said at least one first movement characteristic is displacement; and
said at least one second movement characteristic is acceleration in at least one direction.

43. A methodology according to claim 34 and wherein said at least one first movement characteristic comprises a steering assembly movement characteristic and said at least one second movement characteristic comprises a vehicle chassis movement characteristic.

44. A methodology according to claim 43 and wherein:
said at least one first movement characteristic is displacement; and
said at least one second movement characteristic is acceleration in at least one direction.

45. A system for determining the alertness of a driver of a motor vehicle comprising:
a first sensor sensing at least one first movement characteristic of at least a first part of a motor vehicle;
a second sensor sensing at least one second movement characteristic of at least a second part of said motor vehicle;
a distinguisher, employing at least one time relationship between said at least one first movement characteristic and said at least one second movement characteristic in order to sense and to distinguish between driver initiated movements and non-driver initiated movements; and
an alertness determiner, determining the alertness of said driver of said motor vehicle based on at least one relationship between said driver initiated movements and said non-driver initiated movements.

46. A system according to claim 45 and wherein said at least one first movement characteristic comprises a steering wheel movement characteristic and said at least one second movement characteristic comprises a road wheel movement characteristic.

47. A system according to claim and wherein:
said at least one first movement characteristic is angular displacement of said steering wheel; and
said at least one second movement characteristic is a steering angle of at least one road wheel.

48. A system according to claim 47 and wherein said determining also employs the speed of the vehicle.

49. A system according to claim 45 and wherein said at least one first movement characteristic and said at least one second movement characteristic comprise movement characteristics of first and second locations along a steering assembly extending from a steering wheel to at least one road wheel of said motor vehicle.

50. A system according to claim 49 and wherein said first and second locations are located respectively at or upstream of and at or downstream of a power steering unit forming part of said steering assembly.

51. A system according to claim 50 and wherein said first location is at a steering wheel forming part of said steering assembly.

52. A system according to claim 50 and wherein:
said at least one first movement characteristic is displacement; and
said at least one second movement characteristic is displacement.

53. A system according to claim 49 and wherein:
said at least one first movement characteristic is displacement; and
said at least one second movement characteristic is displacement.

54. A system according to claim 45 and wherein said at least one first movement characteristic comprises a steering assembly movement characteristic and said at least one second movement characteristic comprises a vehicle body movement characteristic.

55. A system according to claim 54 and wherein:
said at least one first movement characteristic is displacement; and
said at least one second movement characteristic is acceleration in at least one direction.

56. A system according to claim 45 and wherein said at least one first movement characteristic comprises a steering assembly movement characteristic and said at least one second movement characteristic comprises a vehicle chassis movement characteristic.

57. A system according to claim 56 and wherein:
said at least one first movement characteristic is displacement; and
said at least one second movement characteristic is acceleration in at least one direction.

58. A system according to claim 45 and also comprising a driver alertness alarm, responsive to an alarm from said driver alertness determiner for providing an alarm to a driver deemed not to be sufficiently alert.

59. A system for determining the alertness of a driver of a motor vehicle comprising:
a distinguisher, employing at least one time relationship between at least one first movement characteristic of at least a first part of a motor vehicle and at least one second movement characteristic of at least a second part of said motor vehicle in order to sense and to distinguish between driver initiated movements and non-driver initiated movements; and
an alertness determiner, determining the alertness of said driver of said motor vehicle based on at least one relationship between said driver initiated movements and said non-driver initiated movements.

60. A system according to claim 59 and wherein said at least one first movement characteristic comprises a steering wheel movement characteristic and said at least one second movement characteristic comprises a road wheel movement characteristic.

61. A system according to claim 60 and wherein:
said at least one first movement characteristic is angular displacement of said steering wheel; and
said at least one second movement characteristic is a steering angle of at least one road wheel.

62. A system according to claim 59 and wherein said at least one first movement characteristic and the second movement characteristic comprise movement characteristics of first and second locations along a steering assembly extending from a steering wheel to at least one road wheel of said motor vehicle.

63. A system according to claim 62 and wherein said first and second locations are located respectively at or upstream of and at or downstream of a power steering unit forming part of said steering assembly.

64. A system according to claim 63 and wherein said first location is at a steering wheel forming part of said steering assembly.

65. A system according to claim 63 and wherein:
said at least one first movement characteristic is displacement; and
said at least one second movement characteristic is displacement.

66. A system according to claim 62 and wherein:
said at least one first movement characteristic is displacement; and
said at least one second movement characteristic is displacement.

67. A system according to claim 59 and wherein said at least one first movement characteristic comprises a steering assembly movement characteristic and said at least one second movement characteristic comprises a vehicle body movement characteristic.

68. A system according to claim 67 and wherein:
said at least one first movement characteristic is displacement; and
said at least one second movement characteristic is acceleration in at least one direction.

69. A system according to claim 59 and wherein said at least one first movement characteristic comprises a steering assembly movement characteristic and said at least one second movement characteristic comprises a vehicle chassis movement characteristic.

70. A system according to claim 69 and wherein:
said at least one first movement characteristic is displacement; and
said at least one second movement characteristic is acceleration in at least one direction.

71. A system according to claim 59 and wherein said determining also employs the speed of the vehicle.

72. A system according to claim 59 and also comprising a driver alertness alarm, responsive to an alarm from said driver alertness determiner for providing an alarm to a driver deemed not to be sufficiently alert.

73. A system for determining the alertness of a driver of a motor vehicle comprising:
a driver initiated movement sensor, sensing at least one characteristic of driver initiated movements of at least one part of a motor vehicle;
a non-driver initiated movement sensor, sensing at least one characteristic of non-driver initiated movements of at least one part of a motor vehicle; and
a determiner, determining the alertness of said driver of said motor vehicle based on at least one relationship between said driver initiated movements and said non-driver initiated movements.

74. A system according to claim 73 and wherein said at least one characteristic of driver initiated movements is extent.

75. A system according to claim 74 and wherein said at least one characteristic of non-driver initiated movements is extent.

76. A system according to claim 74 and wherein extent of driver initiated movements includes at least one of:
the integrated magnitude of the driver initiated movements;
the RMS average of the magnitude of the driver initiated movements;
the number of peaks of the driver initiated movements per unit time.

77. A system according to claim 73 and wherein said at least one characteristic of non-driver initiated movements is extent.

78. A system according to claim 77 and wherein extent of non-driver initiated movements includes at least one of:
the integrated magnitude of the non-driver initiated movements;
the RMS average of the magnitude of the non-driver initiated movements,
the number of peaks of the non-driver initiated movements per unit time.

79. A system according to claim 73 and wherein said driver initiated movement sensor sensing at least one characteristic of driver initiated movements of at least one part of a motor vehicle and said non-driver initiated movement sensor sensing at least one characteristic of non-driver initiated movements of at least one part of a motor vehicle comprise a first sensor, sensing at least one first movement characteristic and a second sensor sensing at least one second movement characteristic of said motor vehicle.

80. A system according to claim 79 and wherein said at least one first movement characteristic comprises a steering wheel movement characteristic and said at least one second movement characteristic comprises a road wheel movement characteristic.

81. A system according to claim 80 and wherein said at least one first movement characteristic and the second movement characteristic comprise movement characteristics of first and second locations along a steering assembly extending from a steering wheel to at least one road wheel of said motor vehicle.

82. A system according to claim 81 and wherein said first and second locations are located respectively at or upstream of and at or downstream of a power steering unit forming part of said steering assembly.

83. A system according to claim 82 and wherein said first location is at a steering wheel forming part of said steering assembly.

84. A system according to claim 82 and wherein:
said at least one first movement characteristic is angular displacement of said steering wheel, and
said at least one second movement characteristic is a steering angle of at least one road wheel.

85. A system according to claim 82 and wherein:
said at least one first movement characteristic is displacement; and
said at least one second movement characteristic is displacement.

86. A system according to claim 81 and wherein:
said at least one first movement characteristic is displacement; and
said at least one second movement characteristic is displacement.

87. A system according to claim 80 and wherein said at least one first movement characteristic comprises a steering assembly movement characteristic and said at least one second movement characteristic comprises a vehicle body movement characteristic.

88. A system according to claim 87 and wherein:
said at least one first movement characteristic is displacement; and
said at least one second movement characteristic is acceleration in at least one direction.

89. A system according to claim 80 and wherein said at least one first movement characteristic comprises a steering assembly movement characteristic and said at least one second movement characteristic comprises a vehicle chassis movement characteristic.

90. A system according to claim 89 and wherein:
said at least one first movement characteristic is displacement; and
said at least one second movement characteristic is acceleration in at least one direction.

91. A system according to claim 73 and also comprising a driver alertness alarm, responsive to an alarm from said driver alertness determiner for providing an alarm to a driver deemed not to be sufficiently alert.

* * * * *